(12) United States Patent
Bhagavatula et al.

(10) Patent No.: US 9,638,873 B2
(45) Date of Patent: May 2, 2017

(54) RECEPTACLE FERRULE ASSEMBLIES WITH GRADIENT INDEX LENSES AND FIBER OPTIC CONNECTORS USING SAME

(75) Inventors: Venkata Adiseshaiah Bhagavatula, Big Flats, NY (US); Jeffery Alan DeMeritt, Painted Post, NY (US); Davide Domenico Fortusini, Ithaca, NY (US); Jacques Gollier, Painted Post, NY (US); James Phillip Luther, Hickory, NC (US)

(73) Assignee: Corning Incorporated, Corning, NY (US)

( * ) Notice: Subject to any disclaimer, the term of this patent is extended or adjusted under 35 U.S.C. 154(b) by 719 days.

(21) Appl. No.: 13/353,768

(22) Filed: Jan. 19, 2012

(65) Prior Publication Data

US 2012/0189252 A1    Jul. 26, 2012

Related U.S. Application Data

(60) Provisional application No. 61/434,593, filed on Jan. 20, 2011, provisional application No. 61/441,956, (Continued)

(51) Int. Cl.
*G02B 6/42* (2006.01)
*G02B 6/32* (2006.01)
(Continued)

(52) U.S. Cl.
CPC .............. *G02B 6/4214* (2013.01); *G02B 6/32* (2013.01); *G02B 6/4206* (2013.01); (Continued)

(58) Field of Classification Search
CPC ............ G02B 6/02328; G02B 6/02347; G02B 6/02376; G02B 6/02385
See application file for complete search history.

(56) References Cited

U.S. PATENT DOCUMENTS

| 4,029,391 A | 6/1977 | French |
| 4,213,677 A | 7/1980 | Sugimoto et al. ......... 350/96.18 |

(Continued)

FOREIGN PATENT DOCUMENTS

| AU | 199898138 B2 | 8/1999 | ............... G02B 6/32 |
| CN | 2136989 Y | 6/1993 | |

(Continued)

OTHER PUBLICATIONS

W. J. Tomlinson, "Applications of GRIN-rod lenses in optical fiber communications systems," Applied Optics, Apr. 1, 1980, vol. 19, No. 7, pp. 1127-1138.

(Continued)

*Primary Examiner* — Thomas A Hollweg
*Assistant Examiner* — Mary A El Shammaa
(74) *Attorney, Agent, or Firm* — Svetlana Z. Short

(57) ABSTRACT

A receptacle ferrule assembly for a fiber optic receptacle connector. The receptacle ferrule assembly comprises a first lens with first second optical surfaces and a receptacle ferrule body having first and second ends. At least one monolithic optical system is formed in a monolithic receptacle ferrule body and includes a lens formed at the second end of monolithic receptacle ferrule body and an optical surface formed at the first end of monolithic receptacle ferrule body. The optical surface is situated adjacent to, and mated to the second optical surface of the first lens The monolithic optical system is configured, in conjunction with the first lens, to define a receptacle optical pathway from the second end of the monolithic optical system to the first surface of the first lens. According to some embodiments the first lens is a gradient index lens.

19 Claims, 19 Drawing Sheets

Related U.S. Application Data filed on Feb. 11, 2011, provisional application No. 61/473,305, filed on Apr. 8, 2011.

(51) Int. Cl.
G02B 6/02 (2006.01)
G02B 6/38 (2006.01)

(52) U.S. Cl.
CPC ........ G02B 6/4293 (2013.01); *G02B 6/02385* (2013.01); *G02B 6/3817* (2013.01)

(56) References Cited

U.S. PATENT DOCUMENTS

| | | | |
|---|---|---|---|
| 4,268,112 A | 5/1981 | Peterson | 350/96.18 |
| 4,701,011 A | 10/1987 | Emkey et al. | 350/96.18 |
| 5,077,815 A * | 12/1991 | Yoshizawa et al. | 385/28 |
| 5,163,107 A | 11/1992 | Garriss | |
| 5,172,271 A | 12/1992 | Sinclair | 359/652 |
| RE34,544 E | 2/1994 | Spears | |
| 5,366,971 A | 11/1994 | Grassberger et al. | |
| 5,384,874 A | 1/1995 | Hirai et al. | 385/34 |
| 5,633,971 A * | 5/1997 | Kurashima | 385/78 |
| 5,708,743 A | 1/1998 | Deandrea et al. | |
| 5,774,607 A | 6/1998 | Shiraishi et al. | |
| 5,784,512 A | 7/1998 | Hensen | 385/61 |
| 5,832,153 A | 11/1998 | Duck | 385/34 |
| 5,850,493 A | 12/1998 | Cheng | 385/34 |
| 5,864,128 A * | 1/1999 | Plesko | 235/462.35 |
| 5,940,564 A * | 8/1999 | Jewell | 385/93 |
| 6,012,852 A | 1/2000 | Kadar-Kallen et al. | 385/74 |
| 6,113,294 A * | 9/2000 | Niwa | 400/621 |
| 6,157,485 A | 12/2000 | Cheng | 359/495 |
| 6,246,026 B1 | 6/2001 | Vergeest | 219/121.72 |
| 6,456,766 B1 * | 9/2002 | Shaw et al. | 385/47 |
| 6,534,119 B1 | 3/2003 | Tsuji et al. | |
| 6,542,665 B2 | 4/2003 | Reed et al. | 385/34 |
| 6,547,455 B1 * | 4/2003 | Hashizume | 385/93 |
| 6,632,025 B2 | 10/2003 | Ukrainczyk | 385/70 |
| 6,655,850 B2 | 12/2003 | Mann et al. | 385/74 |
| 6,687,424 B1 | 2/2004 | Gerdt et al. | 385/34 |
| 6,736,547 B2 | 5/2004 | Stevens et al. | 385/61 |
| 6,862,384 B2 | 3/2005 | Koshi et al. | |
| 6,888,984 B2 | 5/2005 | Abeles et al. | |
| 6,899,464 B2 | 5/2005 | Stevens et al. | 385/53 |
| 6,963,687 B2 | 11/2005 | Vergeest et al. | 385/123 |
| 7,013,378 B2 | 3/2006 | Motta et al. | |
| 7,104,701 B1 | 9/2006 | Durrant et al. | 385/74 |
| 7,151,871 B2 | 12/2006 | Tanaka | |
| 7,190,864 B2 | 3/2007 | Jiang et al. | |
| 7,257,071 B2 | 8/2007 | Kim et al. | |
| 7,264,408 B2 | 9/2007 | Togami et al. | |
| 7,329,050 B1 | 2/2008 | Dugan et al. | 385/55 |
| 7,346,236 B2 | 3/2008 | Asano et al. | 385/34 |
| 7,346,237 B2 | 3/2008 | Matsumura et al. | 385/34 |
| 7,354,205 B2 | 4/2008 | Sakata et al. | |
| 7,357,005 B2 | 4/2008 | Matsumura et al. | 65/387 |
| 7,377,700 B2 * | 5/2008 | Manning et al. | 385/72 |
| 7,460,750 B2 | 12/2008 | Durrant et al. | 385/35 |
| 7,510,336 B2 | 3/2009 | Sakaji et al. | |
| 7,572,071 B1 | 8/2009 | Wu | 385/94 |
| 7,603,008 B2 | 10/2009 | Matsumura et al. | 385/35 |
| 7,730,894 B2 | 6/2010 | Burwell et al. | |
| 7,775,725 B2 | 8/2010 | Grinderslev | 385/74 |
| 2001/0055451 A1 * | 12/2001 | Kuhara et al. | 385/93 |
| 2002/0003705 A1 * | 1/2002 | Tanaka | 362/335 |
| 2002/0006247 A1 * | 1/2002 | Vaganov | 385/17 |
| 2002/0045811 A1 | 4/2002 | Kittrell et al. | |
| 2002/0076174 A1 * | 6/2002 | Toyama | 385/93 |
| 2002/0114568 A1 | 8/2002 | Judkins | |
| 2002/0146211 A1 | 10/2002 | Stevens et al. | 385/61 |
| 2002/0159695 A1 * | 10/2002 | Koshi et al. | 385/34 |
| 2003/0012513 A1 | 1/2003 | Ukrainczyk | 385/61 |
| 2003/0021543 A1 | 1/2003 | Mann et al. | 385/74 |
| 2003/0053222 A1 | 3/2003 | Togami et al. | |
| 2004/0234210 A1 | 11/2004 | Nagasaka et al. | |
| 2005/0069257 A1 | 3/2005 | Bhagavatula et al. | |
| 2006/0198404 A1 * | 9/2006 | Henrichs | 372/29.02 |
| 2006/0222299 A1 | 10/2006 | Durrant et al. | 385/74 |
| 2008/0050072 A1 | 2/2008 | Durrant et al. | 385/74 |
| 2008/0226228 A1 | 9/2008 | Tamura et al. | |
| 2008/0226231 A1 * | 9/2008 | Popp | 385/34 |
| 2008/0279503 A1 * | 11/2008 | Jones | 385/34 |
| 2008/0279509 A1 | 11/2008 | Durrant et al. | 385/72 |
| 2009/0324175 A1 | 12/2009 | Everett et al. | 385/72 |
| 2009/0324176 A1 | 12/2009 | Cheng et al. | 385/73 |
| 2010/0027943 A1 | 2/2010 | Armani et al. | 385/74 |
| 2010/0104244 A1 | 4/2010 | Grinderslev | 385/74 |
| 2010/0215325 A1 | 8/2010 | Tamura et al. | 385/89 |
| 2010/0232743 A1 * | 9/2010 | Ishikawa et al. | 385/14 |
| 2011/0229077 A1 * | 9/2011 | Fortusini et al. | 385/33 |

FOREIGN PATENT DOCUMENTS

| | | | |
|---|---|---|---|
| CN | 1189895 A | 8/1998 | |
| EP | 0 575 993 | 5/2001 | |
| EP | 1 109 041 | 6/2001 | |
| JP | 58099129 | 6/1983 | |
| JP | 63-293510 | 11/1988 | ............... G02B 6/42 |
| JP | 2003107208 | 4/2003 | |
| JP | 2009109578 A | 5/2009 | |
| WO | WO01/11409 A2 | 2/2001 | ............. G02B 23/24 |
| WO | WO03/076993 A1 | 9/2003 | ............... G02B 6/32 |

OTHER PUBLICATIONS

Emkey, et al., "Analysis and Evaluation of Graded-Index Fiber-Lenses," Journal of Lightwave Technology, vol. LT-5, No. 9, Sep. 1987, pp. 1156-1164.
Palais, Joseph C, "Fiber coupling using graded-index rod lenses," Applied Optics, Jun. 15, 1980, vol. 19, No. 12, pp. 2011-2018.
http:\\www.cvimellesgroit.com, "Gradient-Index Lenses".
Chanclou, et al., "Design and demonstration of a multicore single-mode fiber coupled lens device," Optics Communications 233, 2004, pp. 333-339.
Senior, et al., "Misalignment losses at multimode graded-index fiber splices and GRIN rod lens couplers," Applied Optics, Apr. 1, 1985, vol. 24, No. 7, pp. 977-983.
Gilsdorf, et al., "Single-mode fiber coupling efficiency with graded-index rod lenses," Applied Optics, Jun. 1, 1994, vol. 33, No. 16, pp. 3440-3445.
Cusworth, et al., "Angular tilt misalignment loss at a GRIN rod lens coupler," Applied Optics, Jun. 1, 1986, vol. 25, No. 11, pp. 1775-1779.

* cited by examiner

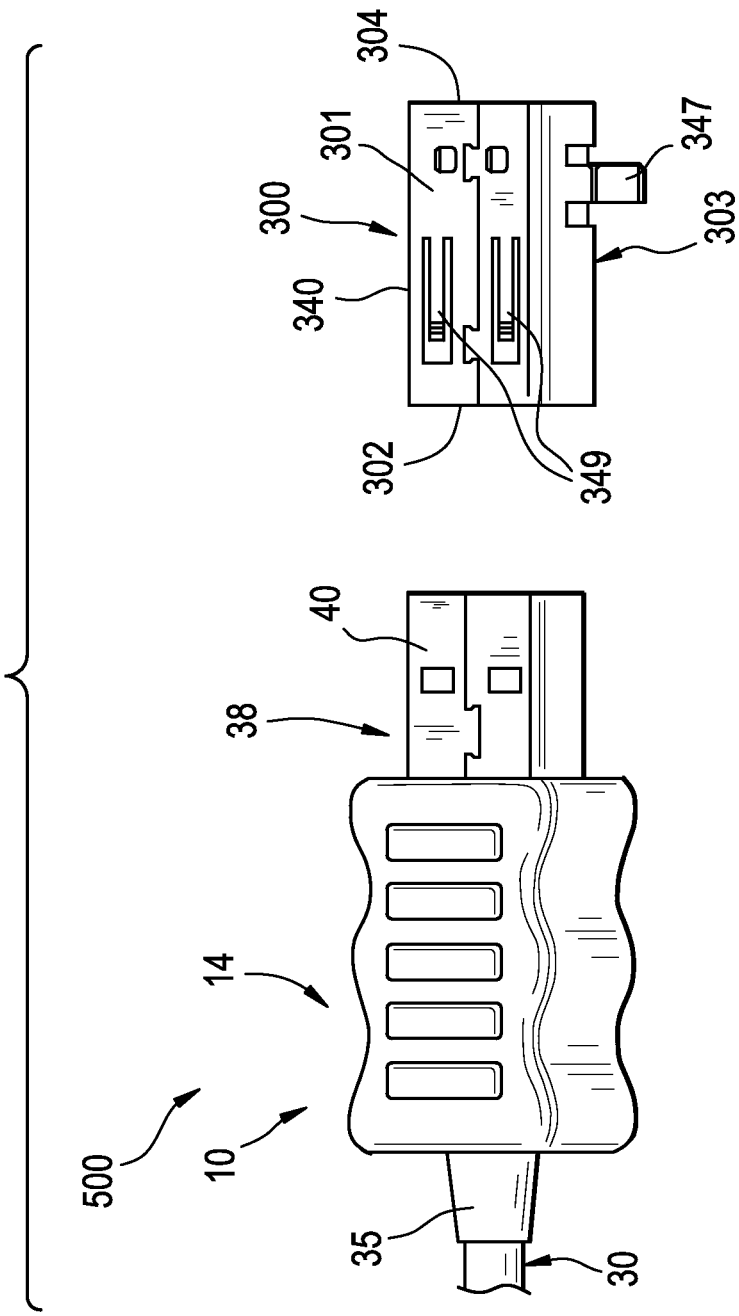

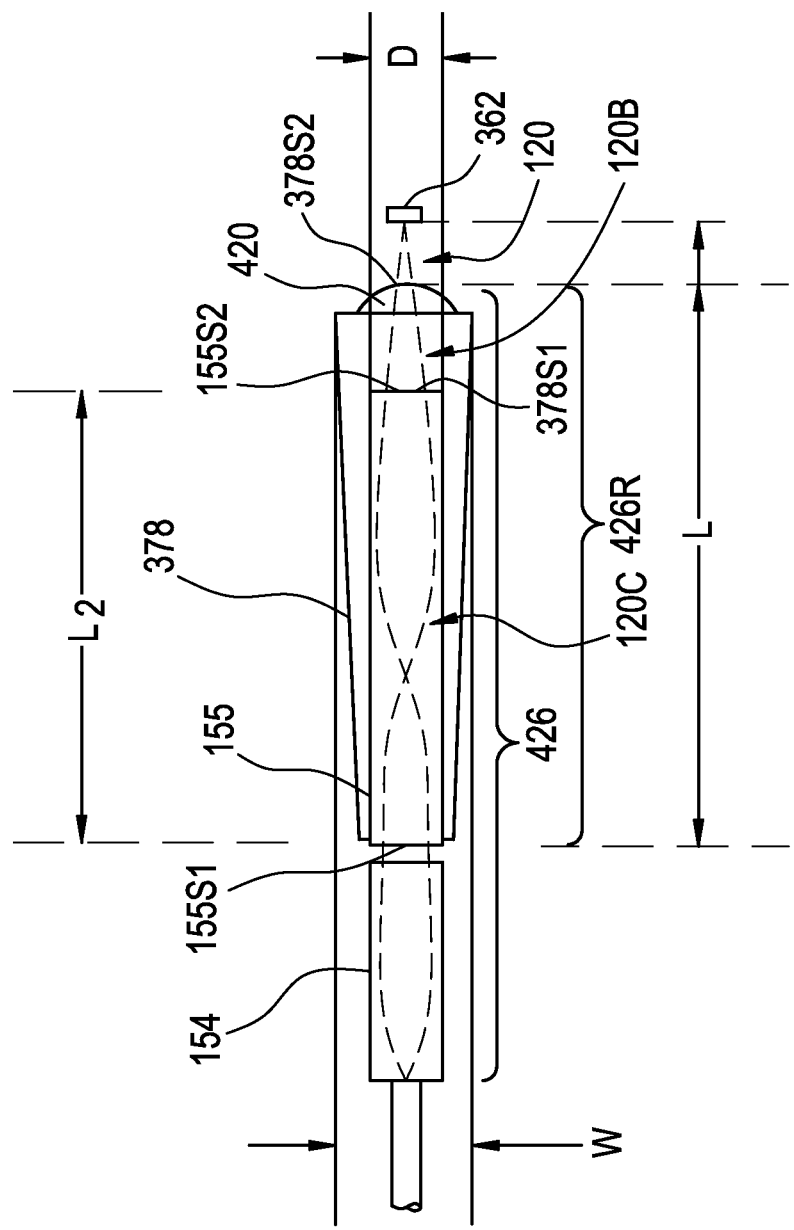

RECEPTACLE FERRULE ASSEMBLIES WITH GRADIENT INDEX LENSES AND FIBER OPTIC CONNECTORS USING SAME

This application claims the benefit of priority under 35 U.S.C. §119 of U.S. Provisional Application Ser. No. 61/434,593 filed Jan. 20, 2011 and U.S. Provisional Application Ser. No. 61/441,956 filed Feb. 11, 2011 and U.S. Provisional Application Ser. No. 61/473,305 filed Apr. 8, 2011 the contents of which are relied upon and incorporated herein by reference in their entirety.

FIELD

The disclosure is directed to ferrules used in fiber optic connectors, and in particular is directed to receptacle ferrules having at least one monolithic lens system, and is also directed to fiber optic connectors and connector assemblies that use such ferrules.

BACKGROUND ART

Optical fiber is increasingly being used for a variety of applications, including but not limited to broadband voice, video, and data transmission. As consumer devices increasingly use more bandwidth, it is anticipated that connectors for these devices will move away from electrical connectors and toward using optical connections. or a combination of electrical and optical connections to meet the bandwidth needs.

Generally speaking, conventional fiber optic connectors used for telecommunication networks and the like are not suitable for consumer electronics devices. For instance, conventional fiber optic connectors are relatively large when compared with the consumer devices and their interfaces. Additionally, conventional fiber optic connectors need to be deployed with great care and into relatively clean environments, and generally need to be cleaned by the craft prior to connection. Such fiber optic connectors are high-precision connectors designed for reducing insertion loss between mating connectors in the optical network. Further, though fiber optic connectors are reconfigurable (i.e., suitable for mating/unmating), they are not intended for the relatively large number of mating cycles normally associated with consumer electronic devices.

Besides operating with a relatively large number of mating/unmating cycles, consumer electronic devices are often used in environments where dust, dirt, liquid contaminants, and like debris are ubiquitous. Further, consumer electronic devices typically have size and space constraints for making connections and may not be amenable to straight optical pathways for the fiber optic connector. Moreover, such size and space constraints may limit the extent of an expanded-beam optical pathway through the fiber optic connector.

SUMMARY

An aspect of the disclosure is receptacle ferrule assembly for a fiber optic receptacle connector. According to at least one embodiment the receptacle ferrule assembly comprises a first lens (e.g., a gradient index) lens with first second optical surfaces and a receptacle ferrule body having first and second ends. At least one monolithic optical system is formed in a monolithic receptacle ferrule body and includes a lens formed at the second end of monolithic receptacle ferrule body and an optical surface formed at the first end of monolithic receptacle ferrule body. The optical surface is situated adjacent to, and mated to the second optical surface of the first lens (for example the second optical surface of the gradient index lens). The monolithic optical system is configured, in conjunction with the positive power lens, to define a receptacle optical pathway from the second end of the monolithic optical system to the first surface of the first lens. Preferably the first lens has positive optical power.

According to some embodiments a connector assembly comprising a plug ferrule assembly is matingly engaged to the receptacle ferrule assembly.

According to some embodiments the first surface of the gradient index lens has a mating geometry configured to form with a plug ferrule a solid-solid contact at an interface between plug and receptacle optical pathways, with the solid-solid contact being sufficient to substantially expel liquid from the interface.

According to some embodiments a plug ferrule assembly is matingly engaged to the receptacle ferrule assembly. For example, according to some embodiments the plug ferrule assembly has a front end configured to engagingly mate with the receptacle ferrule assembly. The plug ferrule assembly of some embodiments includes a plug ferrule body supporting at least one gradient index lens. The gradient index lens of the plug ferrule assembly is: (i) being optically coupled to an end of an optical fiber, and (ii) in conjunction with end of the optical fiber defines a plug optical pathway, and (iii) is supported by the plug ferrule body. The gradient index lens supported by the plug ferrule body is situated adjacent to and is optically coupled to the gradient index lens of the receptacle ferrule assembly in order to form an optical pathway interface between the receptacle optical pathway and the plug optical pathway. According to some embodiments the numerical aperture of the optical fiber is not larger than the numerical aperture of the gradient index lens supported by the plug ferrule body.

According to some embodiments first optical surface of the gradient index lens of the receptacle ferrule assembly is situated a distance of not more than 200 μm from a directly opposing optical surface of said fiber optic plug connector, such that the plug optical pathway is optically coupled through said interface with the receptacle optical pathway, and the distance between the gradient index lens and fiber optic plug connector is being sufficient small to substantially to expel liquid from the interface.

According to at least one embodiment the first surface of the gradient index lens is the front surface of the gradient index lens and the second surface of the gradient index lens is the rear optical surface of the gradient index lens; and the monolithic receptacle ferrule body has top and bottom surfaces and opposite back and front ends. The first surface of the monolithic receptacle ferrule body is at the front end, and the lens is formed at the bottom surface. The optical system further includes a mirror formed at the back end, and has a substantially right-angle bend. In addition, the optical system is configured, in conjunction with the gradient index lens, to define a receptacle optical pathway from the bottom surface to the front end. The front end of the gradient index lens either (i) has mating geometry configured to form with the plug ferrule a solid-solid contact at an interface between the plug and receptacle optical pathways with the solid-solid contact being sufficient to substantially expel liquid from the interface; or (ii) s situated by a distance of not more than 200 μm from the directly opposing optical surface of the fiber optic plug connector, so as to substantially expel liquid from the interface.

According to some embodiments of the connector assembly, the receptacle optical pathway and the plug optical pathway form a telecentric optical system.

According to some embodiments a method of making ferrule assembly comprises the steps of:
  (i) inserting a gradient index rod into a bore of the ferrule body;
  (ii) bonding the gradient index rod to the bore;
  (iii) laser cutting the gradient index rod bonded to the bore at a predetermined length, to separate the portion of said gradient index rod bonded to the bore from another portion of the gradient index rod.

Additional features and advantages will be set forth in the detailed description which follows, and in part will be readily apparent to those skilled in the art from that description or recognized by practicing the same as described herein, including the detailed description that follows, the claims, as well as the appended drawings.

It is to be understood that both the foregoing general description and the following detailed description present embodiments that are intended to provide an overview or framework for understanding the nature and character of the claims. The accompanying drawings are included to provide a further understanding of the disclosure, and are incorporated into and constitute a part of this specification. The drawings illustrate various embodiments and together with the description serve to explain the principles and operation.

BRIEF DESCRIPTION OF THE DRAWINGS

FIG. 6 is an isometric side-elevated view of the example fiber optic connector plug of FIG. 1, along with an example fiber optic connector receptacle configured to mate with the plug to form a fiber optic connector assembly;

FIG. 15A is a schematic optical diagram of an example optical system without a reflector formed by the receptacle ferrule assembly and plug ferrule assembly;

DETAILED DESCRIPTION

The disclosure is directed to ferrules used in fiber optic connectors, and in particular relates to ferrules having at least one lens system. The disclosure is further directed to fiber optic plug and receptacle connectors, and connector assemblies formed by mating plug and receptacle connectors so that the plug and ferrule optical pathways have a solid-solid contact interface. The solid-solid contact interface may be Hertzian, and may also have small gaps that are often associated with contacting extended surfaces. The solid-solid contact interface is preferably formed by the surfaces of two adjacent gradient index (i.e., GRIN) lenses.

The fiber optic connectors and connector assemblies are intended to be suitable for use with commercial electronic devices and provide either an optical connection or both electrical and optical connections (i.e., a hybrid connection). Exemplary plug and receptacle ferrules are described below in the context of the respective plug connectors and receptacle connectors used to form a connector assembly.

The discussion below makes reference to example embodiments where two optical fibers and two optical pathways are shown by way of illustration. However, the disclosure generally applies to one or more optical fibers. In examples, the plug and/or receptacle optical pathways are expanded-beam optical pathways where the light trajectory includes at least a portion where the light rays are not collimated, i.e., they converge and/or diverge, and in some cases can include a portion where the light rays are substantially collimated.

Fiber Optic Connector Plug

Figure 1:
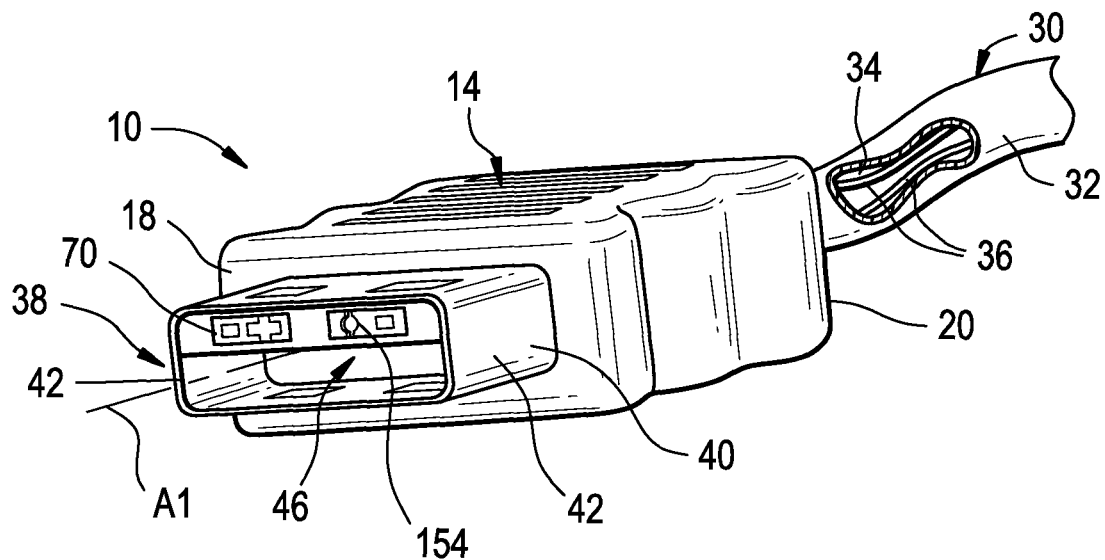
FIG. 1 is an isometric front-end elevated view of an example fiber optic connector plug.

FIG. 1 is an isometric front-end elevated view of an example fiber optic connector plug assembly (hereinafter "plug") 10. Plug 10 includes a plug gradient index (GRIN) lens 154, a plug housing 14 with front and back ends 18 and 20, and a central plug axis A1. Plug housing 14 is configured to receive a fiber optical cable 30 at back end 20. Fiber optical cable 30 includes a jacket 32 that defines an interior 34 that contains one or more optical fibers 36, with two optical fibers shown by way of illustration. The two optical fibers 36 may be, for example, separate transmit and receive fibers. In an example, a boot 35 (see FIG. 6) is used when connecting fiber optic cable 30 to plug housing 14 at back end 20 to prevent significant bending of the fiber optical cable at or near the housing back end. Example optical fibers 36 are multi-mode gradient-index optical fibers.

Plug 10 includes a plug ferrule assembly 38 at plug housing front end 18. Optical fibers 36 extend from cable 30 to plug ferrule assembly 38, as described below. Plug ferrule assembly 38 includes a plug ferrule sleeve 40 having an open front end 42. Plug ferrule sleeve 40 defines a sleeve interior 46. In an example, plug ferrule sleeve 40 is in the form of a generally rectangular cylinder so that open end 42 has a generally rectangular shape associated with common types of electrical connectors, such as a USB connector.

Figure 2:
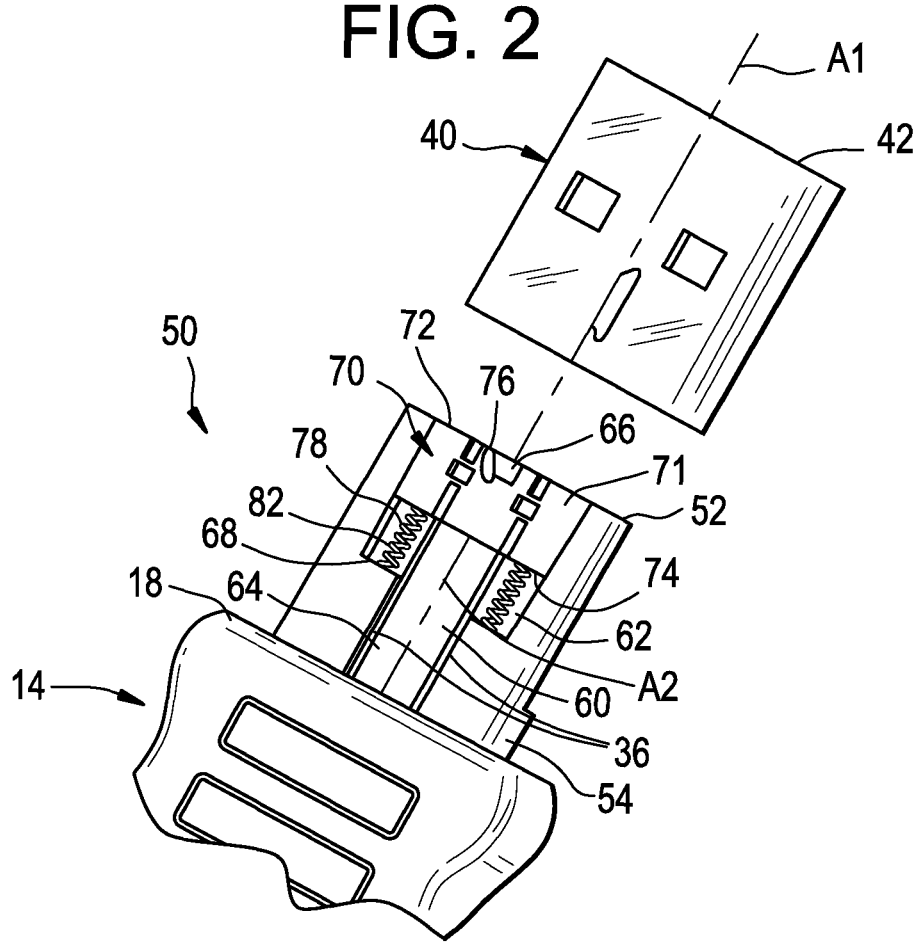
FIG. 2 is an isometric partially exploded top-down view of the fiber optic connector plug of FIG. 1, but with the plug ferrule sleeve removed to reveal a ferrule holder that otherwise resides within the sleeve interior and that supports a plug ferrule.

FIG. 2 is an isometric partially exploded top-down view of plug 10 of FIG. 1, but with plug ferrule sleeve 40 removed to reveal a ferrule holder 50 that otherwise resides within sleeve interior 46 and that may extend into plug housing 14. Ferrule holder 50 includes front and back ends 52 and 54, with the back end adjacent plug housing front end 18. Ferrule holder 50 also includes a slot 60 having a wide section 62 adjacent front end 52, and a narrow section 64 adjacent back end 54. A detent 66 exists at front end 52 along axis A1. The purpose of detent 66 is discussed below.

The transition between the wide and narrow slot sections 62 and 64 defines ferrule holder internal wall sections 68 on either side of axis A1 and that are generally perpendicular thereto. A generally rectangular and planar plug ferrule 70 is slidably arranged in slot 60 in wide section 62. Plug ferrule 70 has a central plug ferrule axis A2 that is co-axial with axis A1 when the plug ferrule is arranged in slot 60.

Figure 3:
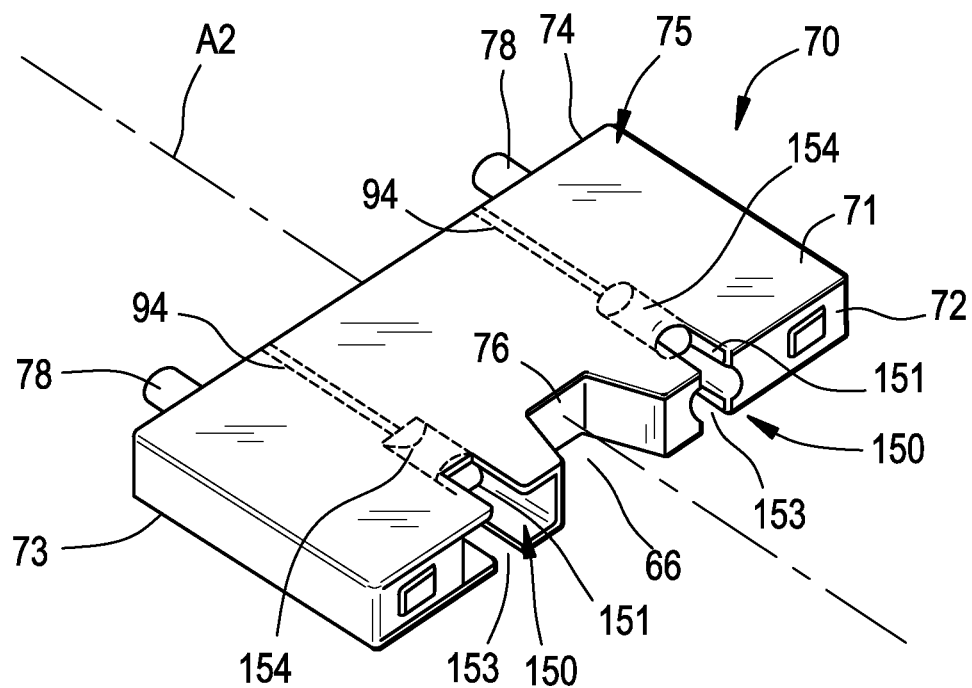
FIG. 3 is an isometric front-end elevated view of the example plug ferrule assembly shown in FIG. 2.
Figure 4:
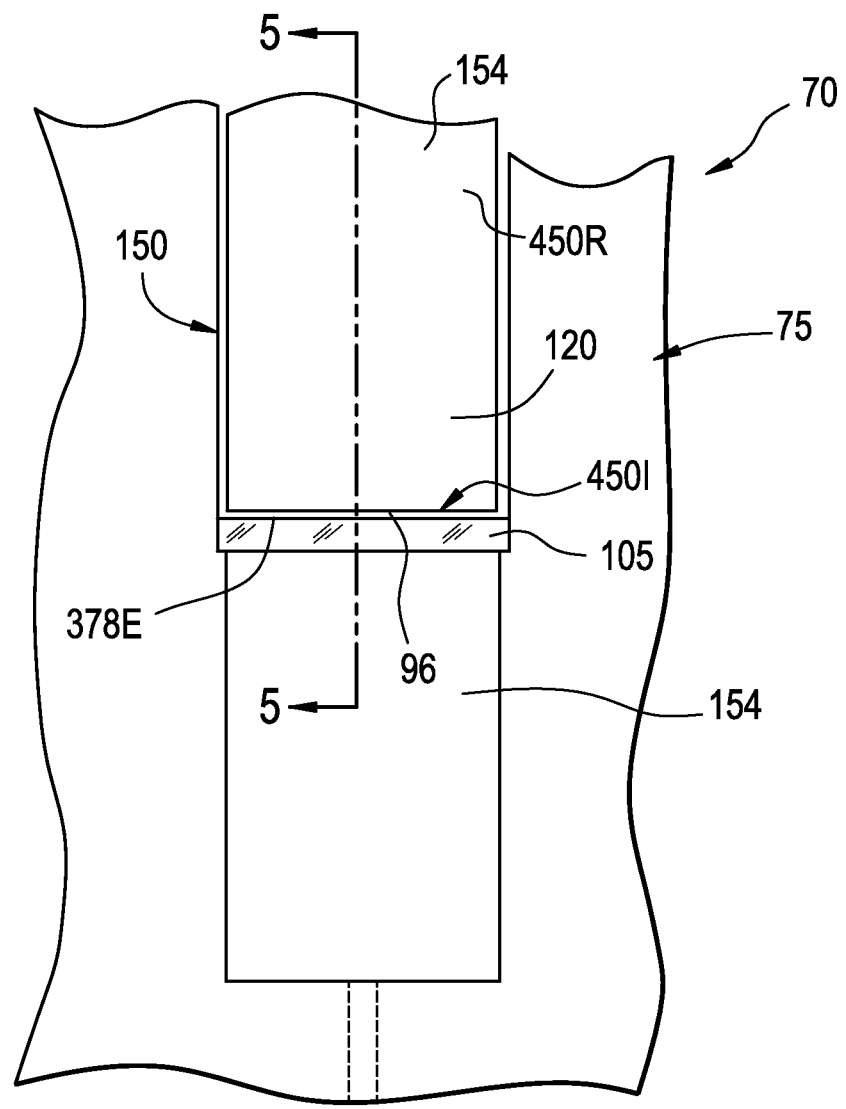
FIG. 4 is a close-up, top-down view of a portion of the plug ferrule assembly that illustrates an example configuration where the plug gradient index (GRIN) lens interfaces with the receptacle gradient index lens to establish an optical pathway interface between the plug optical pathway and the receptacle optical pathway.

FIG. 3 is an isometric front-end elevated view of the example plug ferrule assembly 70 of FIG. 2. FIG. 4 is a close-up, top-down view of a portion of plug ferrule front end 72 that also shows a portion of a plug receptacle assembly introduced and discussed below. With reference to FIGS. 2 through 4, plug ferrule assembly 70 includes a top surface 71, a front end 72, a bottom surface 73 and a back end 74 that define a generally flat and rectangular plug ferrule body 75. Plug ferrule assembly 70 also includes a plug gradient index lens 154 in inside bore 94. Plug ferrule 70 also includes an indent 76 at front end 72 and centered on axis A2. Indent 76 is configured to engage detent 66 to keep plug ferrule front end 72 from extending beyond ferrule holder front end 52 when the plug ferrule is disposed in ferrule holder 50. In an example, plug ferrule 70 is a unitary structure formed by molding or by machining.

With reference to FIG. 2, first and second resilient members 82 are arranged between respective ferrule holder internal wall sections 68 and plug ferrule back end 74 and engage respective retention pins 78. When plug ferrule 70 is subjected to a pushing force along its central axis A2, resilient members 82 compress against internal walls 68, thereby allowing the plug ferrule to slide within slot 60 backward toward the internal walls. When the pushing force is removed, resilient members expand and urge plug ferrule 70 back to its original position at slot front end 62. In an example, resilient members 82 comprise springs. A pushing force can arise for example when plug 10 is inserted into and mated with a receptacle, as discussed below.

Plug ferrule body 75 includes bores 94 that run from back end 74 to front end 72, with a bore end 96 open at the front end. Each bore 94 is sized to accommodate an optical fiber 36 extending forward from back end 78, and a plug gradient index lens 154 extending backward from front end 72. For example, the bore 96 may have a larger diameter near the front end 72, in order to accommodate the gradient index lens. In an example illustrated in FIG. 13 and discussed in greater detail below, bores 94 are additionally configured to accommodate a covered section 36C of optical fiber 36 and an adjacent bare fiber section 36B that includes an end 36E. Plug ferrule 70 is shown as configured to support two optical fibers 36 and two plug gradient index lenses 154. Such a multi-fiber (and optionally multi-lens) configuration is suitable for establishing connections having transmit and receive optical signals carried by different optical fibers. Generally, plug ferrule 70 can be configured to support one or more optical fibers 36 and one or more plug gradient index lenses 154 by including the appropriate number of bores 94.

With continuing reference to FIGS. 3 and 4, plug ferrule assembly 70 further includes respective recesses 150 formed in front end 72 on respective sides of axis A2. Recesses 150 also include top and bottom slots 151 and 153 at top 71 and bottom 73, respectively. In an example shown in FIG. 3, ferrule body 75 includes an angled surface 105 that are angled down to sidewalls 152.

In an example, recesses 150 have different cross-sectional shapes, such as rectangular and circular as shown in FIG. 3. The different shapes for recesses 150 serve to define a mating orientation between plug ferrule 70 and its corresponding receptacle ferrule, which is introduced and discussed below.

Figure 5A:
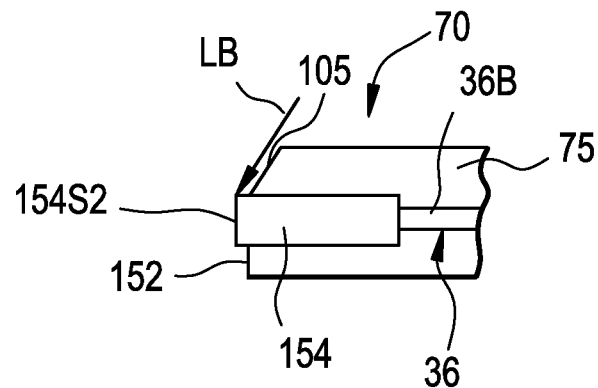
FIG. 5A is a close-up cross-sectional view of the plug ferrule front end and plug gradient index lens as taken along the line 5-5 in FIG. 4.
Figure 5B:
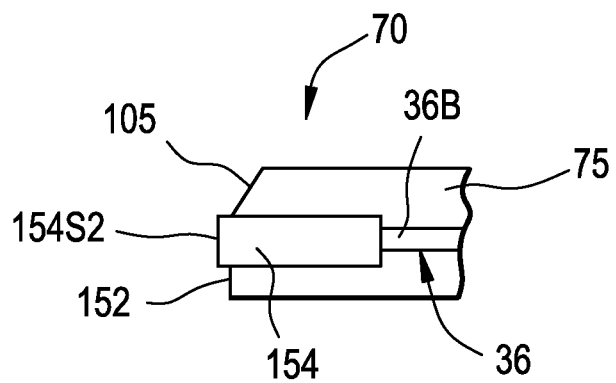
FIG. 5B is similar to FIG. 5A and shows the gradient index lens being laser processed by a laser beam, where the laser beam angle is facilitated by the angled surface adjacent to the plug recess endwall at the front end of the plug ferrule.
Figure 5C:
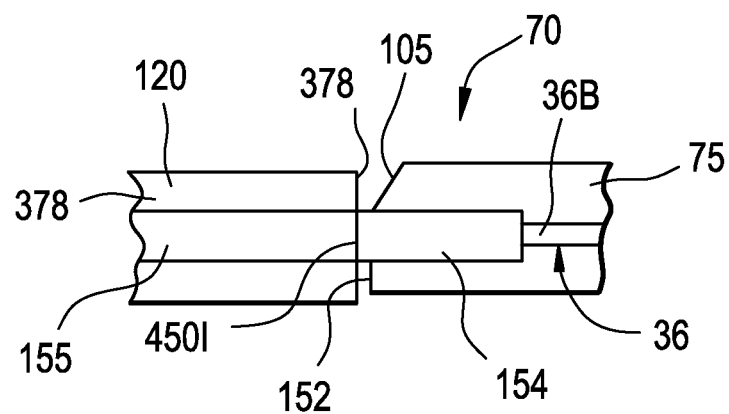
FIG. 5C is similar to FIG. 5B and further shows the receptacle gradient index lens of the receptacle ferrule assembly interfacing with the plug gradient index lens of the plug ferrule assembly to form the optical pathway interface between the plug optical pathway and the receptacle optical pathway.

FIG. 5A is a close-up cross-sectional view of plug ferrule 70 at plug ferrule front end 72 as taken along the line 5-5 in FIG. 4. FIG. 5A shows an angled surface 105 of plug ferrule body 75. Angled surface 105 facilitates laser processing of plug gradient index lens 154 with a laser beam LB to form plug gradient index lens second optical surface 154S2, as shown in FIG. 5B. The laser processing of optical fiber 36 is discussed in greater detail below. FIG. 5C is similar to FIG. 5B and shows a front-end portion of a receptacle ferrule, namely a receptacle guide pin 378. FIG. 5C is discussed in greater detail below.

Fiber Optic Connector Receptacle and Ferrule Assembly

Figure 7:
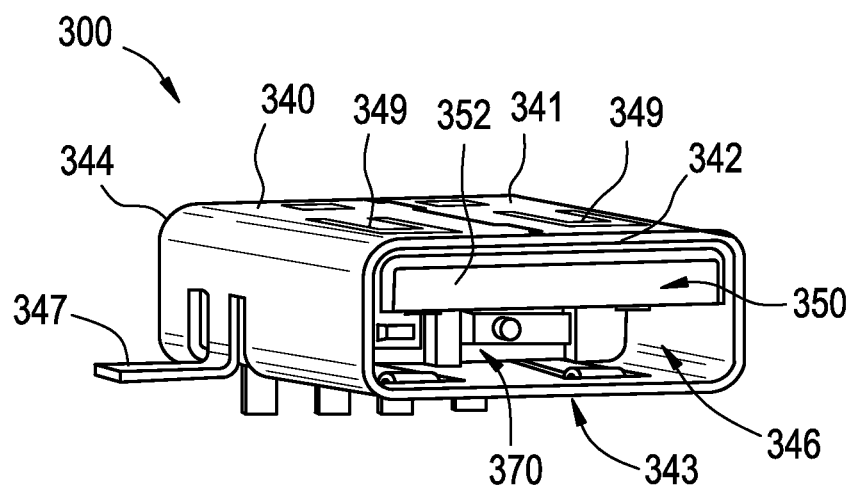
FIG. 7 is an isometric front-end view of the fiber optic connector receptacle of FIG. 6.
Figure 8:
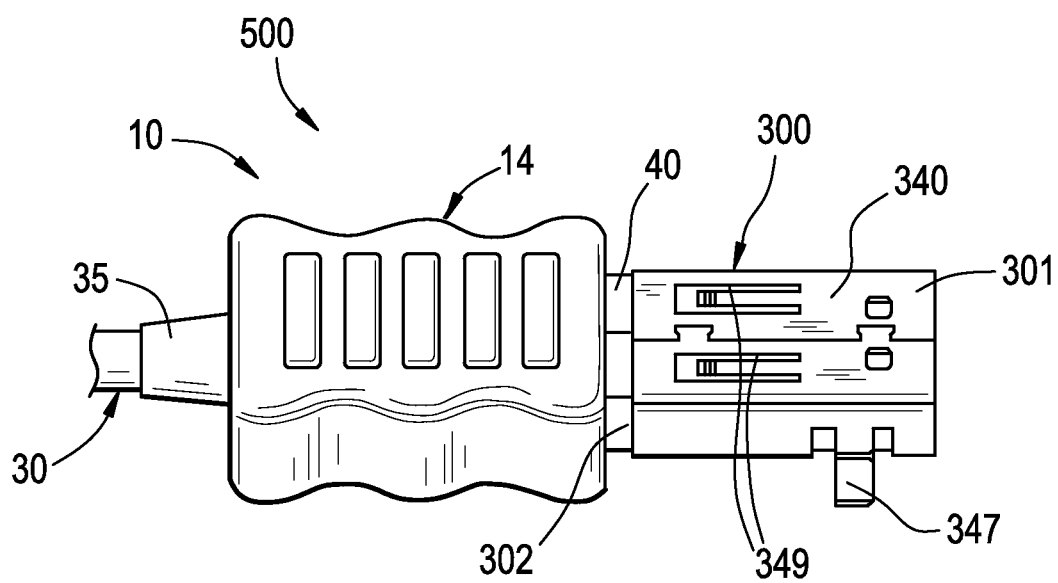
FIG. 8 is an isometric side-elevated view similar to FIG. 6 and illustrates the fiber optic connector plug mated with the fiber optic connector receptacle to form the fiber optic connector assembly.

FIG. 6 is an isometric side-elevated view of plug 10, along with an example fiber optic connector receptacle (hereinafter, "receptacle" 300) configured to mate with the plug to form a fiber optic connector assembly 500. FIG. 7 is a close-up front-end isometric view of receptacle 300. Receptacle 300 includes a receptacle ferrule sleeve 340 having an open front end 342. Receptacle ferrule sleeve 340 defines a sleeve interior 346. In an example, receptacle ferrule sleeve 340 is in the form of a generally rectangular cylinder so that open end 342 has a generally rectangular shape associated with common types of electrical connectors, such as the aforementioned USB connector. FIG. 8 is similar to FIG. 6 and illustrates plug 10 mated to receptacle 300 to form connector assembly 500. Plug 10 mates with receptacle 330 by plug ferrule sleeve 40 sliding into the receptacle ferrule sleeve 340. Receptacle ferrule sleeve 340 thus serves as a receptacle housing.

Figure 9:
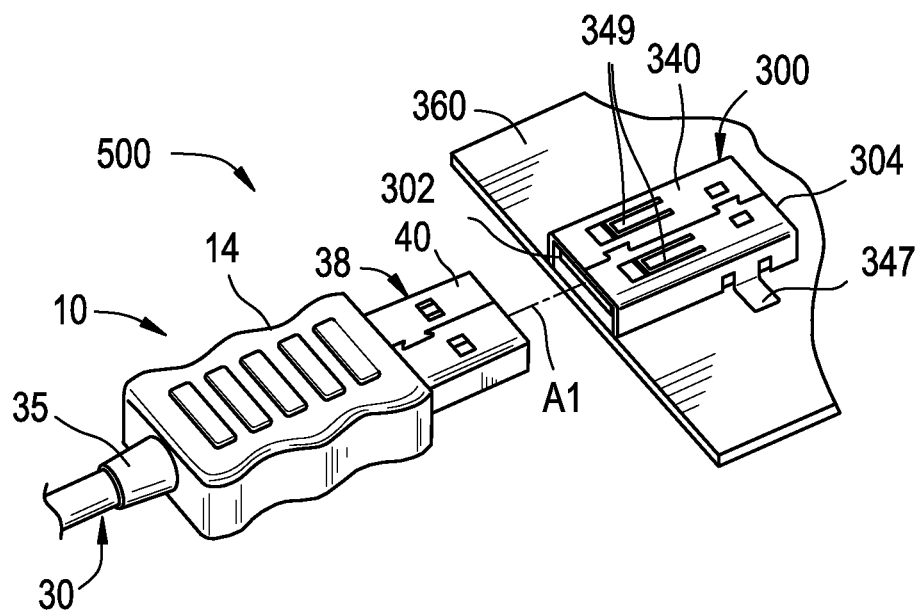
FIG. 9 is an isometric side-elevated view similar to that of FIG. 6 but showing the fiber optic connector receptacle attached to an active device platform.

Ferrule receptacle sleeve 340 includes a tab 347 used to attached the sleeve to an active device platform 360, such as a circuit board (e.g., a motherboard), as illustrated in the isometric side-elevated view of FIG. 9. Ferrule receptacle sleeve 340 also optionally includes latching arms 349 on top surface 341 for securing receptacle 300 to plug 10 when the two are mated to form connector assembly 500. Latching arms 349 are shown as having a cantilevered configuration, but can also have other suitable configurations.

As best seen in FIG. 7, receptacle 300 further includes a receptacle ferrule holder 350 that resides within receptacle sleeve interior 346 and that holds a receptacle ferrule assembly 370. Receptacle ferrule holder 350 includes a front end 352 that substantially coincides with ferrule receptacle sleeve front end 342 and that forms a configuration for receptacle sleeve interior 346 that compliments the configuration of plug sleeve interior 46 so that the plug and receptacle can matingly engage.

Figure 10A:
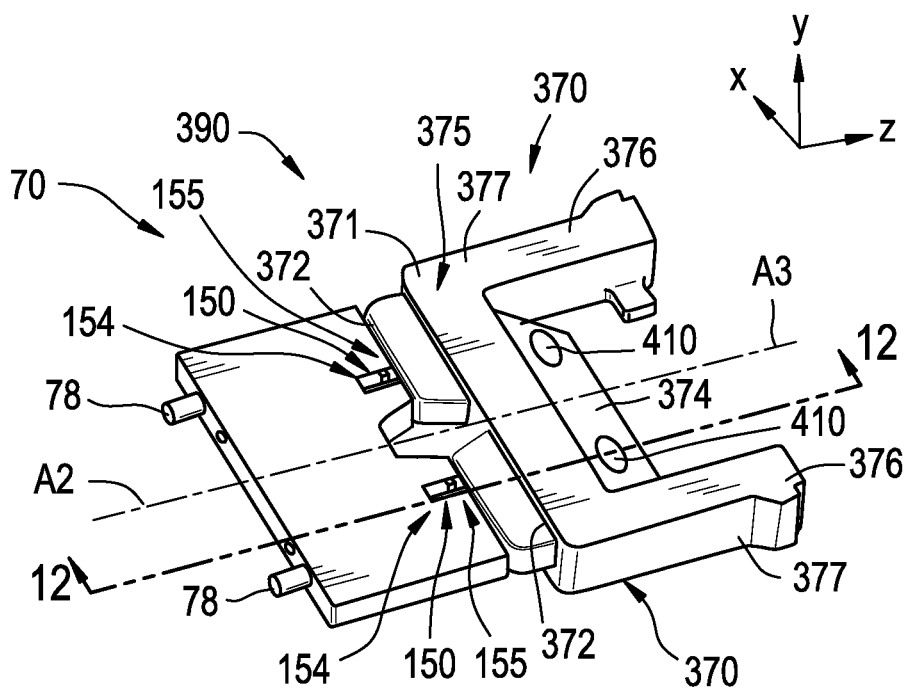
FIG. 10A and FIG. 10B are isometric top-side and bottom-side elevated views of an example receptacle ferrule assembly shown engaged with the plug ferrule assembly of FIG. 3 to form a fiber optic connector assembly.
Figure 10B:
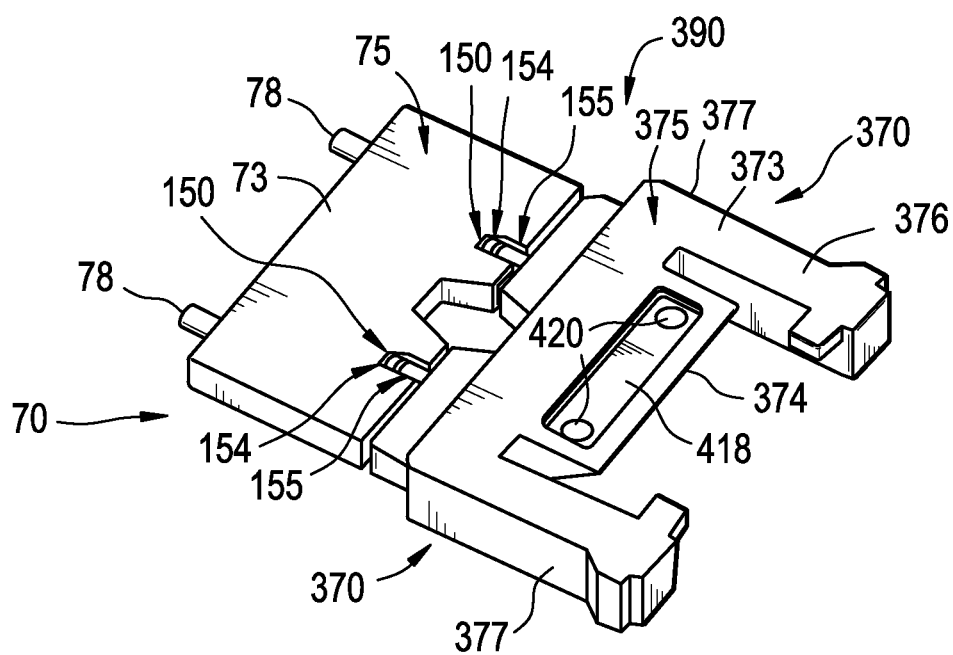

FIG. 10A and FIG. 10B are isometric top-side and bottom-side elevated views of an example receptacle ferrule assembly 370 shown engaged with plug ferrule assembly 70 to form a connector assembly 390. Cartesian coordinates are shown for the sake of reference. Receptacle ferrule assembly 370 has a central receptacle ferrule axis A3 that is co-axial with plug ferrule axis A2 when the receptacle and plug ferrules are matingly engaged as shown. Receptacle ferrule assembly 370 includes a gradient index lens and a ferrule body 375 having a top surface 371, a front end 372, a bottom surface 373, and a back end 374. Receptacle ferrule 370 also includes arms 376 on either side of receptacle ferrule axis A3 that define sides 377 of receptacle ferrule 370 and that give the receptacle ferrule a squared-off U-shape.

In an example, receptacle ferrule body 375 is a unitary (monolithic) structure formed by molding or by machining. In another example, receptacle ferrule body 375 is formed from multiple pieces. Also in an example, receptacle ferrule body 375 is made of a transparent material such as a transparent resin that transmits light 120 having an optical telecommunications wavelength, such as 850 nm, 1310 nm and 1550 nm. In an example, light 120 has a wavelength in the range from 850 nm to 1550 nm. An example transparent resin is unfilled Polyetherimide (PEI), sold by the General Electric Company under the trademarked name ULTEM® 1010, which has an index of refraction of 1.6395 at 850 nm.

Receptacle ferrule front end 372 includes receptacle gradient index lenses 155 located on respective sides of axis A3 and that extend parallel thereto. Receptacle gradient index lenses 155 have respective first and second optical surfaces 155S1 and 155S2. Receptacle gradient index lenses 155 are configured to respectively engage recesses 150 of plug ferrule 70 so that receptacle gradient index lens 155 first optical surfaces 155S1 make contact with or come in close proximity to second surfaces 154S2 of plug gradient index lenses 154. Plug ferrule front end 72 and receptacle ferrule front end 372 are thus configured with complementary geometries so that they can matingly engage. Gradient index lenses 154, 155 may be manufactured, for example, from a transparent glass such as amorphous silica containing a gradient of Germania or other updopant. The concentration of updopant is decreased, preferably monotonically, (for example, in a linear, stepwise, or in parabolic manner), preferably varying smoothly from the optical axis (highest amount) toward the edge of the lens's exterior surface to provide the desired refractive index profile. Thus, for example, if the gradient index lens has a circular cross-section, its refractive index can decrease along the radius with the highest refractive index being along the optical axis, preferably producing a parabolic refractive index profile.

Receptacle ferrule back end 374 is in an example angled relative to top surface 371 and includes mirrors 410 on respective sides of axis A3, with the mirrors being aligned with receptacle gradient index lenses 155 in the Z-direction. In an example mirrors 410 are curved and thus have optical power. In an example, mirrors 410 comprise a curved portion of receptacle ferrule body 375, formed for example by molding. In one example, the reflectivity of mirrors 410 derives at least in part from internal reflection within receptacle ferrule body 375. In another example embodiment, a reflective layer 412 is provided on the curved portions of ferrule body 375 on back end 374 that define mirrors 410 to enhance the reflection (see FIG. 11A, introduced and discussed below). Reflective layer 412 is thus external to but immediately adjacent to ferrule body 375. In an example, mirrors 410 employ both internal reflection and reflection from the reflective layer. However, in some exemplary embodiments the mirrors may be planar. Furthermore, some exemplary embodiments, as described below, may not utilize mirrors.

With reference to FIG. 10B, receptacle ferrule body 375 also includes a recess 418 formed in bottom surface 373 and in which reside lenses 420. Lenses 420 are aligned in the Y-direction with respective mirrors 410. Recess 418 is used to set back lenses 420 from the plane defined by surrounding generally planar bottom surface 373. In an example, the set back is selected to provide a distance between lenses 420 and corresponding active devices 362. In the present disclosure, recess 418 is considered part of bottom surface 373.

Figure 11A:
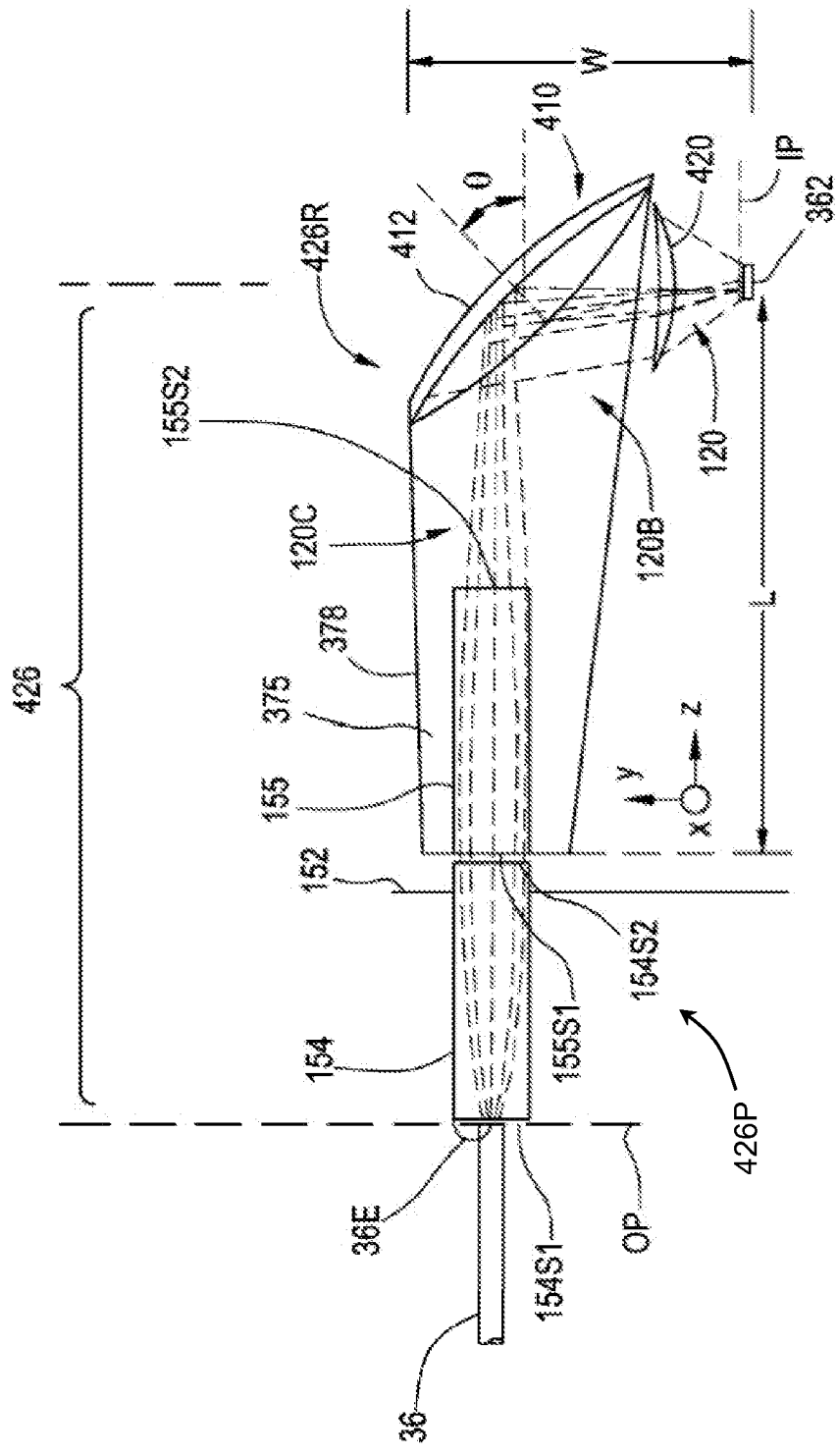
FIG. 11A is a schematic optical diagram of an example optical system formed in the receptacle ferrule assembly and plug ferrule assembly.

Mirror 410 and lens 420 constitute a two-element optical system 449 in one example, which formed a monolithic optical system. FIG. 11A is a close-up schematic optical diagram of an example optical system 426 comprising plug optical system 426P and receptacle optical system 426R. Receptacle optical system 426R comprises the monolithic optical system (i.e., mirror 410 and lens 420) and the receptacle gradient index lens (GRIN) lens 155. Plug optical system 426P comprises plug gradient index (GRIN) lens 154. Cartesian coordinates and an angular coordinate θ are shown for reference. Example dimensions for the example optical system as set forth in Table 1 below are also included in FIG. 11A. Optical system 426 has an object plane OP and an image plane IP, which can be reversed depending on the direction of light travel. The terms "object plane" and "image plane" are used loosely here to denote the respective locations of active device 362 and optical fiber end 36E, and to indicate that light is being relayed from one plane to the other. In FIG. 11A, the direction of travel of light 120 is based on active device 362 being a source of light (optical radiation), such as a Vertical-Cavity Surface-Emitting Laser (VCSEL) that emits light 120, and optical fiber 36 receiving the light at fiber end 36E. Optical system 426 can operate in reverse where active device 362 is a detector and optical fiber 36 emits light at fiber end 36E. However, one can optimize the radii and conic constants of the lenses and the lengths and refractive index profiles of the gradient index lenses differently for optical system 426 when active device 362 is a detector in order to improve (e.g., optimize) light coupling efficiency. In the cases where fiber 36 is emitting light at fiber end 36E, in order to maximize the collection of the emitted light, it is preferred that the gradient-index lenses have a refractive index profile such that the numerical aperture of the gradient-index lenses is equal to or higher than the numerical aperture of optical fiber 36.

Note that in the example of optical system 426 shown in FIG. 11A, two-element optical system 449 is formed as a monolithic structure in receptacle ferrule body 375. In an example, mirror 410 and lens 420 are biconic surfaces, meaning that each has different radii of curvature in orthogonal directions. In an example, mirror 410 and lens 420 both have positive optical power. In another example, mirror 410 is a planar surface.

Table 1A sets forth exemplary optical system design parameters for a variant of optical system 426 in which the optical path is bent by approximately 90°. In the table all distance measurements are in millimeters and angular measurements are in degrees.

For the design of optical system 426 as set forth in Table 1A, there is no need to apply a reflective coating to mirror 410, because efficient reflection takes place by total internal reflection within the receptacle ferrule body 375. This assumes that the medium surrounding the receptacle ferrule body is air and not a material having a higher refractive index than air. With other designs, depending on the material used to form receptacle ferrule body 375 and the refractive index of the surrounding medium, it may be necessary to apply a reflective coating to mirror 410 to obtain efficient reflection.

It is noted here that receptacle ferrule assembly 370 can generally have one or more receptacle optical systems 426R, with the number of optical systems defined by the number of optical fibers 36 supported by plug ferrule 70. It is noted that preferably, according to the following embodiments of Tables 1A-3C, the gradient index lenses 154, 155 have planar surface(s). These surfaces may be oriented perpendicular to the optical axis, or be angled with respect to the optical axis. The Optical System of Table 1A is optimized for coupling light from the active device to the optical fiber, to provide as much light as possible to the fiber.

TABLE 1A

Optical system including the receptacle with a GRIN lens and with optical turn

| Parameter (units) | Value and units |
|---|---|
| Operating wavelength | 850 nm |
| Material for monolithic receptacle ferrule body 375 | Ultem 1010, refractive index = 1.6395 at 850 nm |
| Material for Receptacle GRIN lens 155 and Plug GRIN lens 154, and refractive index data for two GRIN lenses | Doped silica glass, with parabolic refractive index profile<br>Refractive index at center = 1.482 at 850 nm<br>Refractive index at edge = 1.452 at 850 nm<br>Diameter = 0.34 mm |

TABLE 1A-continued

Optical system including the receptacle with a GRIN lens and with optical turn

| Parameter (units) | Value and units |
|---|---|
| Numerical aperture of optical source | 0.22 |
| Distance from active device 362 to vertex of lens 420 | 0.165 mm |
| Lens 420 | Radius of curvature = 0.538 mm<br>Conic constant = −15.448<br>Clear aperture = 0.3 mm |
| Distance from vertex of lens 420 to mirror/reflector 410 | 0.35 mm |
| Mirror/reflector 410 | Planar surface |
| Distance from mirror/reflector 410 to second optical surface 155S2 of receptacle gradient index lens 155 | 0.3 mm |
| Length of receptacle GRIN lens 155 | 0.6 mm |
| Length of Plug GRIN lens 154 | 1.396 mm |

In an example, receptacle optical system 426R has a length L and a width W as shown in FIG. 11A, where L is about 1 mm and W is about 0.8 mm. In an example the gradient index lens has a roughly parabolic refractive index profile, a length L2, and diameter D, where L2 is about 0.6 mm mm and D is about 0.34 mm. Preferably, the gradient index lens 155 and/or 154 has a center refractive index that is 1.015 to 1.035 times its edge refractive index. Preferably the lens 420 has a conic constant C that is more negative than −2, for example −12 to −18.

Figure 11B:
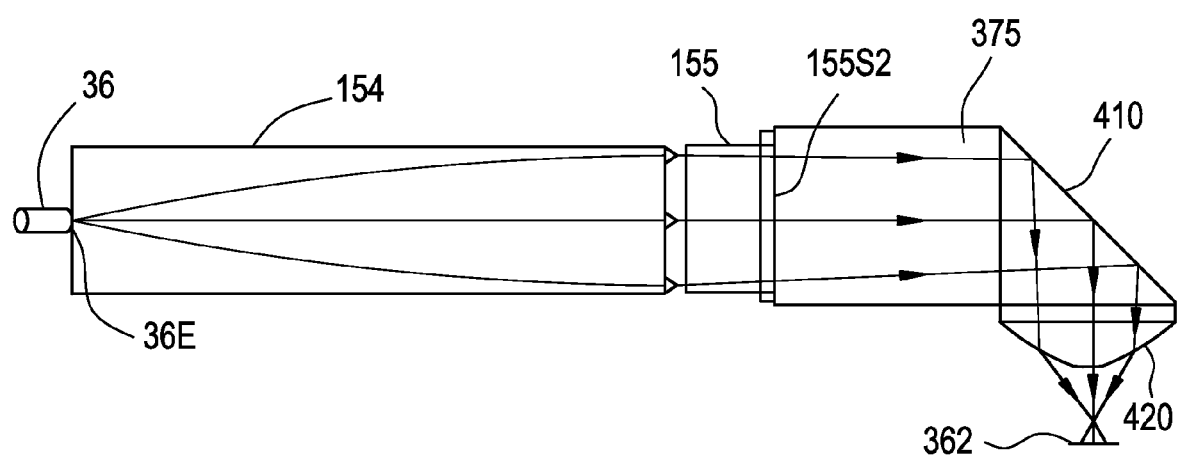
FIG. 11B is a schematic optical diagram of another example optical system formed in the receptacle ferrule assembly and plug ferrule assembly.

Another exemplary embodiment of the optical system 426 is illustrated in FIG. 11B. This exemplary optical system is optimized for use with an optical fiber 36 is a graded-index multimode fiber with core diameter of 80 μm and a numerical aperture (NA) of 0.29. Table 1B sets forth exemplary optical system design parameters the optical system 426 in which the optical path is bent by approximately 90°. In the table all distance measurements are in millimeters and angular measurements are in degrees. This embodiment also does not need to utilize a reflective coating to mirror 410, because efficient reflection takes place by total internal reflection within the receptacle ferrule body 375. This optical system of Table 1B is optimized for coupling light from the optical fiber to the active device (i.e., receiver such as photo-detector), to provide as much light as possible to the receiver.

TABLE 1B

Optical System including the receptacle with optical turn and with receptacle GRIN lens of less than ½ pitch length.

| Parameter (units) | Value and units |
|---|---|
| Operating wavelength | 850 nm |
| Material for monolithic receptacle ferrule body 375 | Ultem 1010, refractive index = 1.6395 at 850 nm |
| Material for Receptacle GRIN lens 155 and Plug GRIN lens 154 and refractive index data for the GRIN lenses | Doped silica glass, with parabolic refractive index profile<br>Refractive index at center = 1.482 at 850 nm<br>Refractive index at edge = 1.452 at 850 nm<br>Diameter = 0.34 mm |
| Diameter of active area of active device 362 (photodiode) | 60 μm |
| Distance from active device 362 to vertex of lens 420 | 0.165 mm |
| Lens 420 | Radius of curvature = 0.110 mm<br>Conic constant = −2.800<br>Clear aperture = 0.4 mm |

TABLE 1B-continued

Optical System including the receptacle with optical turn and with receptacle GRIN lens of less than ½ pitch length.

| Parameter (units) | Value and units |
|---|---|
| Distance from vertex of lens 420 to mirror/reflector 410 | 0.35 mm |
| Mirror/reflector 410 | Planar surface |
| Distance from mirror/reflector 410 to second optical surface 155S2 of receptacle gradient index lens 155 | 0.7 mm |
| Length of receptacle GRIN lens 155 | 0.2 mm |
| Length of Plug GRIN lens 154 | 1.340 mm |

In an example, receptacle optical system 426R has a length L and a width W as shown in FIG. 11B, where L is about 1 mm and W is about 0.8 mm. In an example the gradient index lens has a roughly parabolic refractive index profile, a length L2, and diameter D, where L2 is about 0.2 mm and D is about 0.34 mm. Preferably, the gradient index lens 155 and/or 154 has a center refractive index that is 1.015 to 1.035 times its edge refractive index. In this embodiment the lens 420 has the radius of curvature of about 0.1 mm, conic constant C of −2.8, and the length of the receptacle gradient index lens 155 is 0.2 mm.

Figure 12:
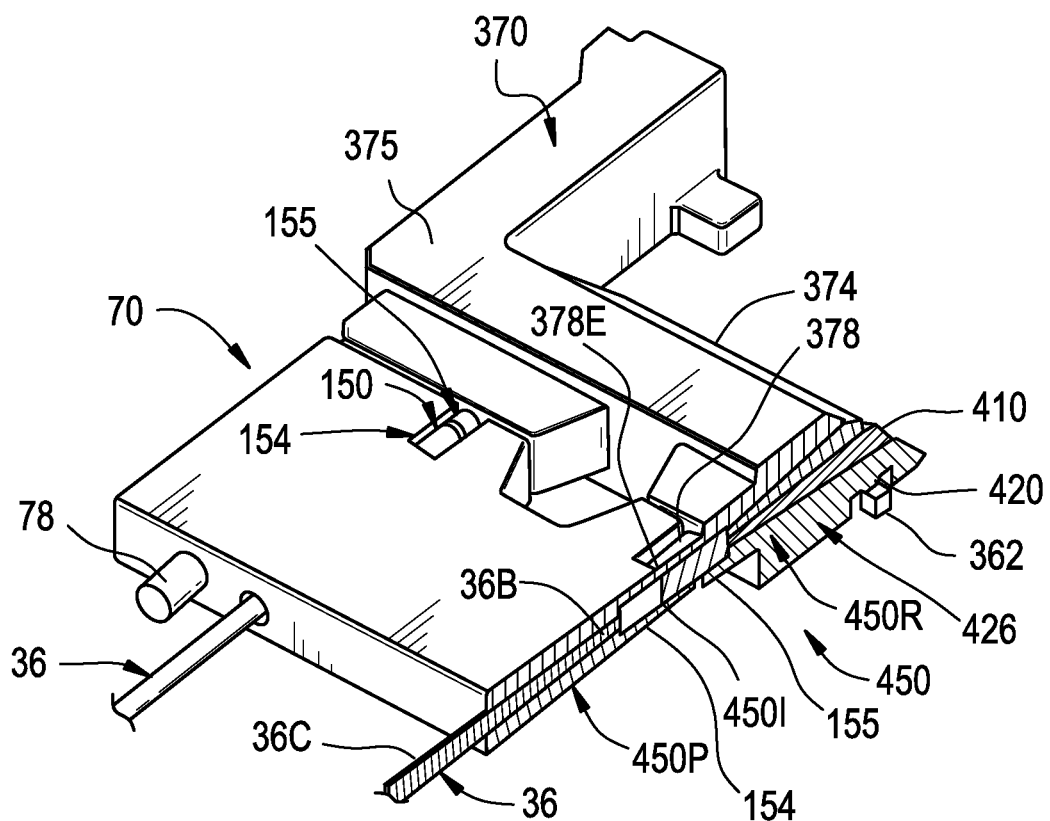
FIG. 12 is an isometric, top-side elevated and cut-away view of the ferrule assembly shown in FIG. 10A, with the cross-section taken along the line 12-12 therein.
Figure 13:
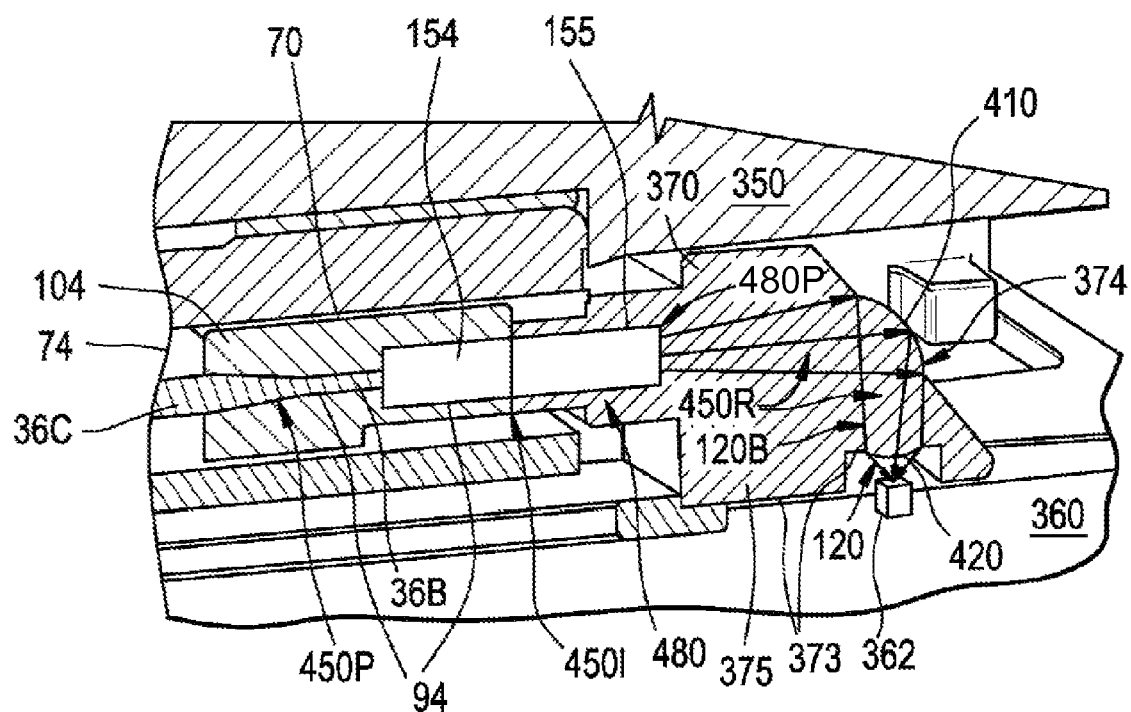
FIG. 13 is a close-up, cross-sectional view of a portion of the ferrule assembly of FIG. 12, showing the combined plug and receptacle optical pathways that join at an optical pathway interface formed by interfacing the plug gradient index lens at the plug with the receptacle gradient index lens.

FIG. 12 is an isometric, top-side elevated and cut-away view of the ferrule assembly 390 of FIG. 10A, as taken along the line 12-12. FIG. 13 is a close-up cross-sectional view of a portion of the ferrule assembly of FIG. 12. FIGS. 12 and 13 also show a portion of active device platform 360 that includes active device 362 in the form of a light emitter that emits light 120. An example light emitter device is a vertical-cavity surface-emitting laser (VCSEL). Active device 362 may also be a detector such as a photodiode in the case where light 120 originates at the optical fiber end of fiber optic connector assembly 500 (FIG. 8). In the present embodiment, a light emitter configuration for active device 362 is shown by way of example. In an example, active device platform 360 supports one or more active devices 362 and further in an example supports at least one light emitter and one light detector (i.e., photodetector). In an example, the number of active devices 362 equals the number of optical systems 426.

FIGS. 12 and 13 show an optical pathway 450 between active device 362 and optical fiber 36 and when plug 10 and receptacle 300 are mated to form ferrule assembly 390. Optical pathway 450 includes two main sections, namely a plug optical pathway 450P on the plug side, and a receptacle optical pathway 450R on the receptacle side. Plug optical pathway 450P is defined by plug gradient index lens 154 and optical fiber 36 since light 120 is guided therein. The receptacle gradient index lens 155 resides closely within a bore 480 formed at the front end of the monolithic receptacle ferrule body 375 so that the monolithic receptacle body surrounds an outside portion of the receptacle gradient index lens. FIGS. 11A and 13 show an example configuration where the back surface 155S2 of receptacle gradient index lens 155 is in contact with the bore planar end 480P, which defines an optical surface of the monolithic receptacle ferrule body 375. The plug and receptacle optical pathways 450P and 450R interface at an optical pathway interface 450I where first optical surface 155S1 of receptacle gradient index lens 155 of receptacle ferrule assembly 370 makes contact with plug gradient index lens second optical surface 154S2. This situation may occur when receptacle gradient index lens first optical surface 155S1 comes in contact with plug gradient index lens second optical surface 154S2 (see, e.g., FIG. 4) or comes in close proximity thereto. In some example embodiments, the plug gradient index lens 154 extends a short distance out from plug recess wall 152 (see e.g., FIGS. 5B and 5C). In some example embodiments, the receptacle gradient index lens 154 extends a short distance out from the receptacle ferrule body).

In one example, light 120 from active device 362 at object plane OP initially travels over receptacle optical pathway 450R in the Y-direction. Light 120 starts out as divergent and is allowed to expand as it travels toward lens 420. The amount of light expansion is a function of the divergence of light 120 and the distance between active device 362 and the lens. Light 120 then encounters lens 420, which in an example has positive optical power. Positive lens 420 acts to bend the divergent light 120 more toward the optical axis, which forms an expanding (diverging) light beam 120B, i.e., light beam 120B is not collimated. Active device 362 is thus optically coupled to receptacle optical pathway 450R. Preferably, the active device 362 is situated at a distance of 0.1 mm to 0.6 mm from the vertex of the lens 420.

Expanding light beam 120B proceeds from lens 420 to mirror 410, where it is reflected substantially 90 degrees. In this example receptacle optical pathway 450R thus includes a substantially right-angle bend defined by mirror 410 that allows for a substantially right-angle optical connection to active device 362.

Light beam 120C proceeds from mirror 410 through a portion of receptacle ferrule body 375 to the planar end 480P of bore 480 and to the second surface 155S2 of receptacle GRIN lens 155 in contact therewith. Receptacle GRIN lens 155 acts to reduce the divergence of the light beam. In an example the light beam is substantially collimated when it reaches optical pathway interface 450I. Receptacle optical pathway 450R interfaces with plug optical pathway 450P at optical pathway interface 450I, which is defined by first optical surface 155S1 of the receptacle gradient index lens 155 and the second optical surface 154S2 of the plug gradient index lens 154. Light 120C thus passes directly from receptacle 300 to plug 10 through optical pathway interface 450I.

After crossing optical pathway interface 450I the light enters plug optical pathway 450P, which comprises plug GRIN lens 154. Plug GRIN lens 154 acts to focus the light beam to a sufficiently small size to allow coupling to optical fiber 36.

Preferably, the length of the receptacle optical pathway is between 0.3 mm and 12 mm, more preferably between 0.5 mm and 8 mm, even more between 0.6 mm and 6 mm. It is also preferable that the distance from the active device 362 to the fiber is 1 mm to 9 mm, more preferably 1 mm to 6 mm and most preferable between 1.2 mm and 3 mm. It is also preferable that the numerical aperture (NA) of the active device 362 is about 0.2 to 0.3 (e.g., 0.22), the numerical aperture NA of the fiber is 0.2 to 0.3 (e.g., 0.29) that the core diameter of the fiber be at least 30 µm, preferably at least 60 µm, and most preferably 75 µm to 85 µm (e.g., 80 µm). It is also preferable that the magnification M provided by the optical system (source to fiber) is about 0.85 (i.e., 0.85±0.15, more preferably 0.85±0.1). Preferably, the diameter of GRIN lens(es) is between 250 µm and 600 µm, more preferably between 275 µm and 400 µm.

To maximize the transmission of optical power from plug to receptacle it is preferable to control both lateral (or radial) offset and angular alignment of plug and receptacle optical systems 426P and 426R. This, for example, can be accomplished with the aid of housings or sleeves which provide rough alignment used in combination with features integral to the plug and receptacle ferrule bodies for fine alignment. One can match the tolerance to error of the optical systems with the alignments achievable in the components providing mechanical alignment. The diameters of the gradient index lenses affect the performance of that the optical system because larger diameters lead to reduced sensitivity of loss due to radial offset, but also to an increased sensitivity of loss to errors of angular alignment or non-parallelism of optical axes. Conversely smaller diameters provide reduced sensitivity to errors of angular alignment but increased sensitivity of loss to radial offset. The sensitivity to these errors can be quantified by using optical ray-tracing to calculate the optical coupling efficiency in the presence of alignment errors, for example using commercially available ray-tracing computer software. Surprisingly, by using ray-tracing to calculate the optical coupling efficiency in the presence of alignment errors, we found that a gradient index lens diameter D, where 280 µm≤D≤380 µm and, more preferably 330 µm≤diameter≤350 µm provides an ideal combination of sensitivities to radial and angular errors and improves the overall performance of the optical system in an optical assembly.

Table 2A sets forth example optical system design parameters for optical system 426 as shown in FIG. 15A. In the table all distance measurements are in millimeters and angular measurements are in degrees.

The optical designs set forth in Tables 1A, 2A and 3A are optimized for the direction of light from active device 362 to fiber end 36E. The design is optimized based on the following four main conditions: 1) optical fiber 36 is a graded-index multimode fiber with core diameter of 80 µm and a numerical aperture (NA) of about 0.29; 2) Active device 362 is in the form of a VCSEL with a circular active area having diameter of 10 micrometers; 3) the operating wavelength is 850 nm; and 4) the monolithic receptacle ferrule body 375 that realizes the two-element optical system 449 is made of the aforementioned ULTEM® 1010, which has a refractive index n=1.6395 at the stated operating wavelength. The plug gradient index lens 154 and receptacle gradient index lens 155 are formed of amorphous Silica and Germania so combined as to provide a parabolic gradient of refractive index.

It is noted that the optical system designs of Tables 1A-3B can be easily modified to provide similar performance. For example, if one of the distances is changed, then the gradient index profile, or the length of one or both of the gradient index lenses, or the radius of curvature or conic constant of the lens formed at the second end of monolithic receptacle can be changed to maintain optical performance.

For example, in the optical system design of Table 1A, if the distance from mirror/reflector 410 to second optical surface 155S2 of receptacle gradient index lens 155 is increased from 0.3 mm to 0.4 mm, the length of receptacle gradient index lens 155 is reduced from 0.6 mm to 0.56 mm and the radius of curvature of lens 420 is changed from 0.538 mm to 0.558 mm, the desired optical performance is maintained. It is also noted that if the distance from the vertex of lens 420 to mirror/reflector 410 is changed by a value x and the distance from mirror/reflector 420 to second surface 155S2 of receptacle gradient index lens 155 is changed by an equal and opposite value −x, the optical performance is essentially unaffected.

For example, it is noted that the tolerances for the radius of curvature and conic constant of lens 420 for the exemplary embodiments corresponding to Tables 1A, 1B, 2A, 2B and 3A-3B is are ±20%, preferably ±15%, more preferably about ±10%, and most preferably ±5%. The tolerance on the distance from active device 362 to vertex of lens 420 is, for example, ±20 µm and preferably ±10 µm. The tolerance on the total distance (measured along the direction of the optical rays) from vertex of lens 420 to second optical surface 155S2 of receptacle gradient index lens 155 is, for example, ±40 µm and preferably ±30 µm The tolerance on the length of the gradient index lenses, for example, can be, is ±20 µm and preferably ±10 µm and more preferably ±5 µm. Also, for example, for the optical systems of Tables 1A and 2A the distance from active device 362 to vertex of lens 420 may be 0.145 mm to 0185 mm and the radius of curvature for lens 420 may be 0.43 to 0.65 mm, (e.g., 0.53 to 0.55 mm). It is also noted that the optical designs can be scaled up or down, by increasing or reducing linear dimensions (e.g., radii and distances) by the same multiplication factor, without affecting optical performance.

It is also noted that the length of any of the gradient lenses can be also changed by a distance that is approximately equal to an integer number (n) of half pitches (n×½P). For example, the length or receptacle gradient index lens 155 can be increased by an integer number of half pitches, thus increasing the length of receptacle optical system 426R. In some embodiments, the length L of the gradient index lens(s) is longer than 0.25P, wherein P is the pitch of the gradient index lens. In some embodiments, the length of at least one of the gradient index lenses is longer than 0.5P, wherein P is the pitch of the gradient index lens. The longer gradient index lenses unexpectedly provide the advantage of increasing the overall length of the optical system, thus permitting a greater separation distance between the active device 362 and the fiber 36, without compromising the optical performance of the system.

It is noted here again that receptacle ferrule assembly 370 can generally have one or more receptacle optical systems 426R, with the number of optical systems defined by the number of optical fibers 36 supported by plug ferrule 70.

TABLE 2A

Optical System including receptacle without optical turn.

| Parameter (units) | Value and units |
| --- | --- |
| Operating wavelength | 850 nm |
| Material for monolithic receptacle ferrule body 375 | Ultem 1010, refractive index = 1.6395 at 850 nm |
| Material for Receptacle GRIN lens 155 and Plug GRIN lens 154, and refractive index data for the GRIN lenses | Doped silica glass, with parabolic refractive index profile<br>Refractive index at center = 1.482 at 850 nm<br>Refractive index at edge = 1.452 at 850 nm<br>Diameter = 0.34 mm |
| Numerical aperture of optical source | 0.22 |
| Distance from active device 362 to vertex of lens 420 | 0.165 mm |
| Lens 420 | Radius of curvature = 0.538 mm<br>Conic constant = −15.448<br>Clear aperture = 0.3 mm |
| Distance from vertex of lens 420 to second optical surface 155S2 of receptacle gradient index lens 155 | 0.65 mm |
| Length of receptacle GRIN lens 155 | 3.272 mm |
| Length of Plug GRIN lens 154 | 1.396 mm |

In an example, as shown in FIG. 15A, the optical path that corresponds to the optical system 426R has a length L and the optical system 426R has a width W, where L is about 4.1 mm and W is about 1.0 mm. As shown in FIG. 15, in at least an example gradient index lens 155 has a roughly parabolic refractive index profile, a length L2 and diameter D as shown in FIG. 15A where L2 is about 3.3 mm and D is about 0.34 mm.

Figure 15B:
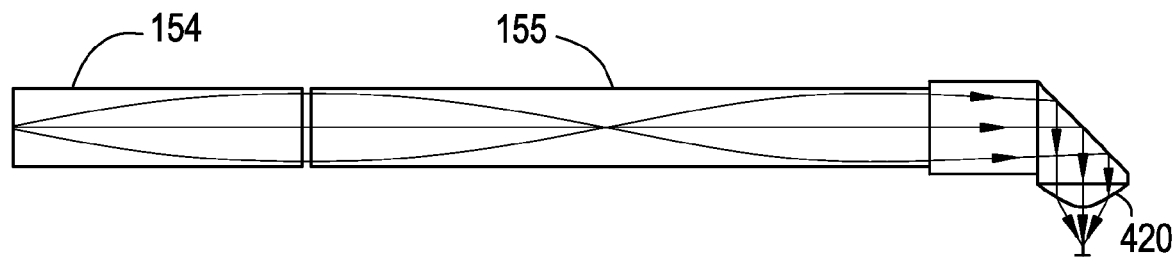
FIG. 15B is a schematic optical diagram of another example optical system.
Figure 15C:
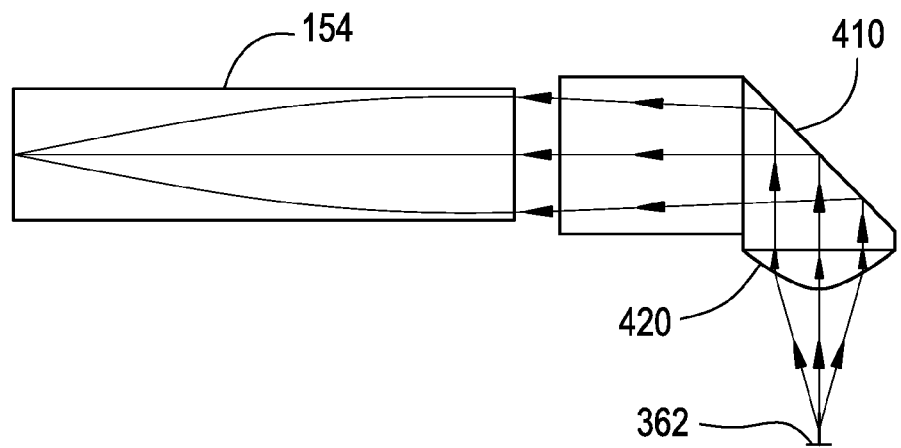
FIG. 15C is a schematic optical diagram of another example optical system.

Table 2B sets forth example optical system design parameters for an optical system in which receptacle optical system 426R comprises mirror 410 and lens 420 and includes gradient index lenses 154, 155. This optical system is illustrated in FIG. 15B. This exemplary optical system is optimized for optimum optical coupling from the exemplary optical fiber 36 to the active device 362 (e.g., a receiver such as a photodetector, for example—i.e., to provide the maximum amount of light to the active device 362. In this example the optical fiber 36 is a graded-index multimode fiber with core diameter of 80 μm and a numerical aperture (NA) of 0.29.

TABLE 2B receptacle with optical turn and with receptacle GRIN lens of more than ½ pitch length.

| Parameter (units) | Value and units |
| --- | --- |
| Operating wavelength | 850 nm |
| Material for monolithic receptacle ferrule body 375 | Ultem 1010, refractive index = 1.6395 at 850 nm |
| Material for Receptacle GRIN lens 155 and Plug GRIN lens 154 | Doped silica glass, with parabolic refractive index profile<br>Refractive index at center = 1.482 at 850 nm<br>Refractive index at edge = 1.452 at 850 nm<br>Diameter = 0.34 mm |
| Diameter of active area of active device 362 (photodiode) | 60 μm |
| Distance from active device 362 to vertex of lens 420 | 0.165 mm |
| Lens 420 | Radius of curvature = 0.110 mm<br>Conic constant = −2.8<br>Clear aperture = 0.4 mm |
| Distance from vertex of lens 420 to mirror/reflector 410 | 0.35 mm |
| Mirror/reflector 410 | Planar surface |
| Distance from mirror/reflector 410 to second optical surface 155S2 of receptacle gradient index lens 155 | 0.7 mm |
| Length of receptacle GRIN lens 155 | 2.872 mm |
| Length of Plug GRIN lens 154 | 1.340 mm |

Table 3A sets forth example optical system design parameters for an optical system, in which receptacle optical system 426R comprises mirror 410 and lens 420 and does not comprise a gradient index lens. This system is illustrated schematically in FIG. 15C.

TABLE 3A

The optical system including the receptacle with optical turn and without the receptacle GRIN lens

| Parameter (units) | Value and units |
| --- | --- |
| Operating wavelength | 850 nm |
| Material for monolithic receptacle ferrule body 375 | Plastic (Ultem 1010), refractive index = 1.6395 at 850 nm |
| Material for Plug GRIN lens 154 | Doped silica glass, with parabolic refractive index profile<br>Refractive index at center = 1.482 at 850 nm<br>Refractive index at edge = 1.452 at 850 nm<br>Diameter = 0.34 mm |
| Numerical aperture of optical source | 0.22 |
| Distance from active device 362 to vertex of lens 420 | 0.6 mm |

TABLE 3A-continued

The optical system including the receptacle with optical turn and without the receptacle GRIN lens

| Parameter (units) | Value and units |
| --- | --- |
| Lens 420 | Radius of curvature = 0.375 mm<br>Conic constant = −3<br>Clear aperture = 0.5 mm |
| Distance from vertex of lens 420 to mirror/reflector 410 | 0.35 mm |
| Mirror/reflector 410 | Planar surface |
| Distance from mirror/reflector 410 to optical surface formed at first end of monolithic receptacle ferrule body | 0.75 mm |
| Length of Plug GRIN lens 154 | 1.38 mm |

Figure 15D:
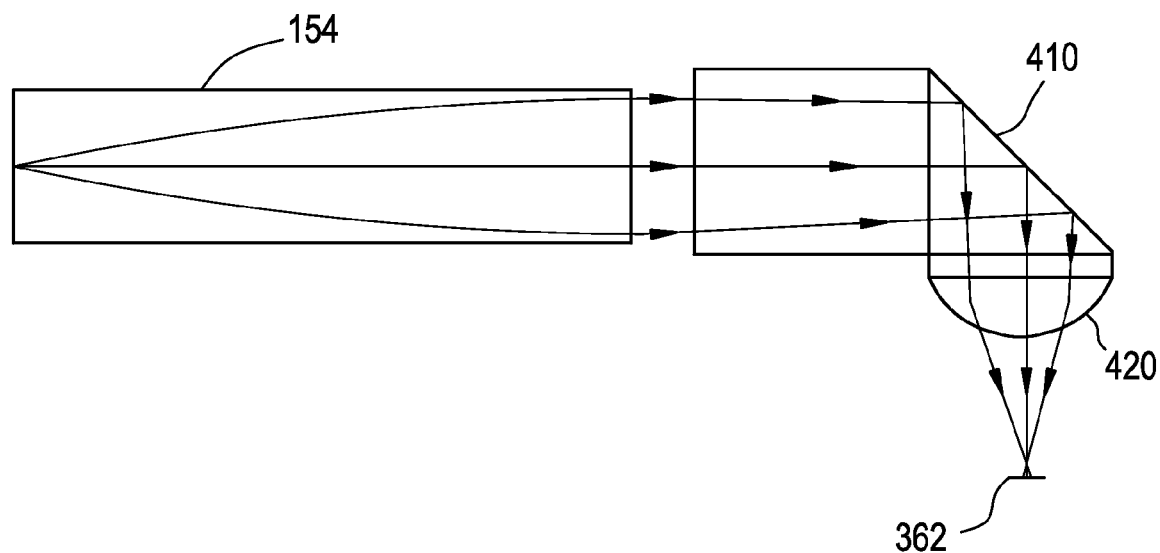
FIG. 15D is a schematic optical diagram of yet another example optical system.

Table 3B, below, sets forth an example optical system design parameters for an optical system shown in FIG. 15D. In this exemplary optical system the receptacle optical system does not include a gradient index lens. The optical system of this embodiment is optimized for coupling light from the optical fiber to the active device.

TABLE 3B

| Parameter (units) | Value and units |
| --- | --- |
| Operating wavelength | 850 nm |
| Material for monolithic receptacle ferrule body 375 | Ultem 1010, refractive index = 1.6395 at 850 nm |
| Material for Plug GRIN lens 154 | Doped silica glass, with parabolic refractive index profile<br>Refractive index at center = 1.482 at 850 nm<br>Refractive index at edge = 1.452 at 850 nm<br>Diameter = 0.34 mm |
| Diameter of active area of active device 362 (photodiode) | 60 μm |
| Distance from active device 362 to vertex of lens 420 | 0.165 mm |
| Lens 420 | Radius of curvature = 0.110 mm<br>Conic constant = −2.800<br>Clear aperture = 0.4 mm |
| Distance from vertex of lens 420 to mirror/reflector 410 | 0.35 mm |
| Mirror/reflector 410 | Planar surface |
| Distance from mirror/reflector 410 to optical surface formed at first end of monolithic receptacle ferrule body | 0.9 mm |
| Length of Plug GRIN lens 154 | 1.540 mm |

Figure 14:
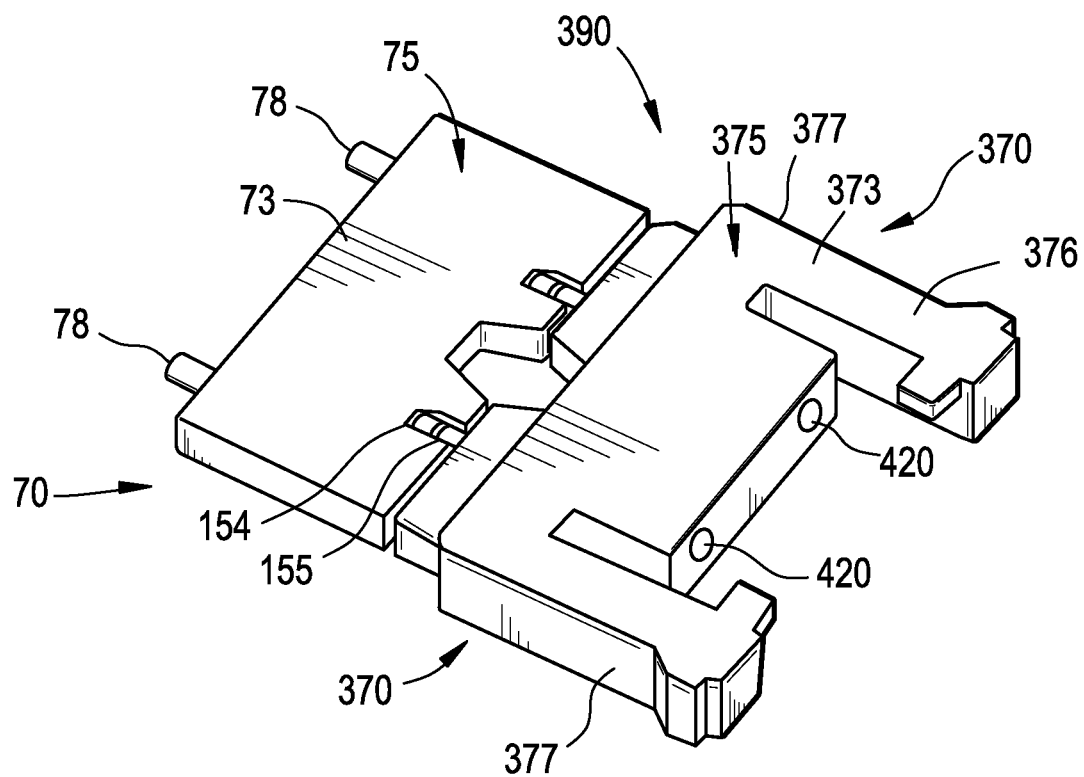
FIG. 14 is an isometric top-side elevated view of an example receptacle ferrule assembly shown engaged with the plug ferrule assembly of FIG. 3.
Figure 16:
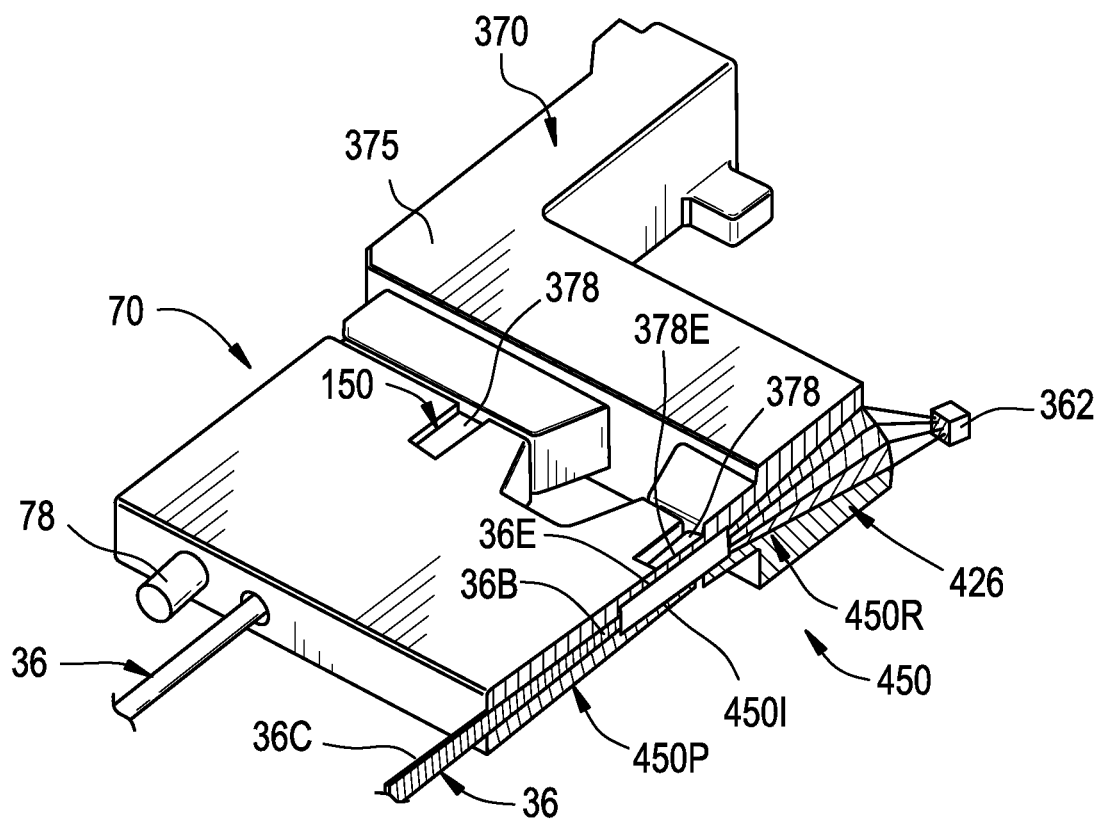
FIG. 16 is an isometric, top-side elevated and cut-away view of the ferrule assembly shown in FIG. 14, with the cross-section taken along the line 12-12 therein.
Figure 17:
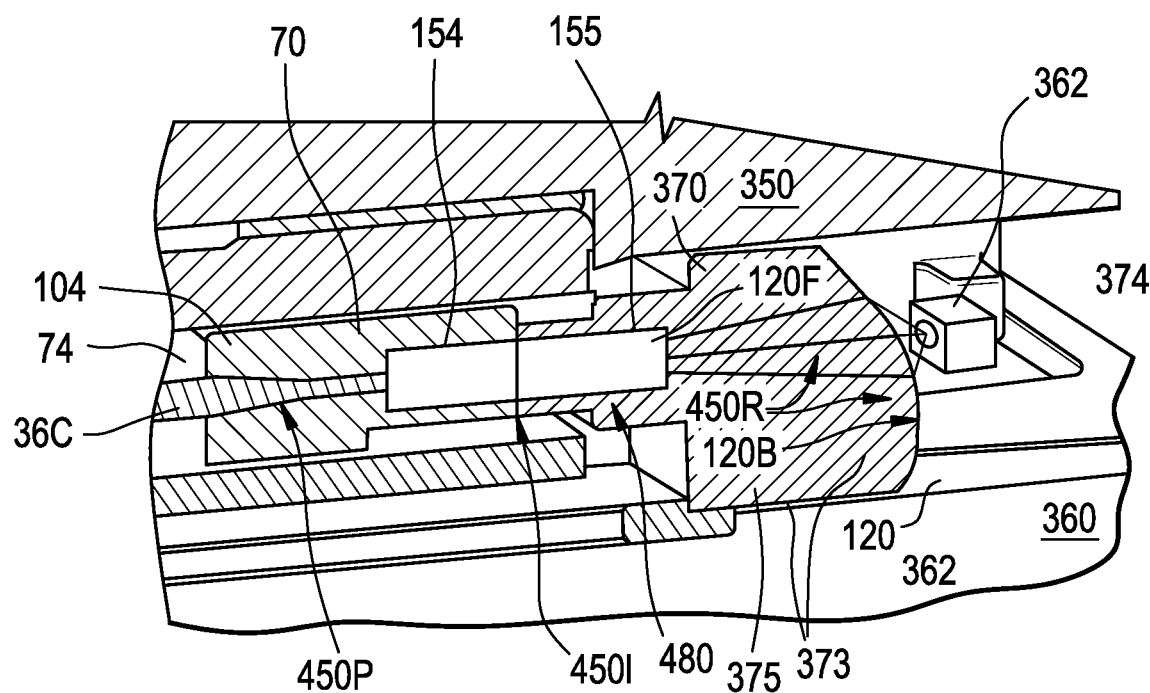
FIG. 17 is a close-up, cross-sectional view of a portion of the ferrule assembly of FIG. 16, showing the combined plug and receptacle optical pathways that join at an optical pathway interface formed by interfacing the plug gradient index lens with the receptacle gradient index lens.

FIG. 16 is an isometric, top-side elevated and cut-away view of the ferrule assembly 390 of FIG. 14, as taken along the line 12-12. FIG. 17 is a close-up cross-sectional view of a portion of the optical connector of FIG. 16. FIGS. 16 and 17 also show a portion of active device platform 360 that includes active device 362 in the form of a light emitter that emits light 120. An example light emitter device is a vertical-cavity surface-emitting laser (VCSEL). Active device 362 may also be a detector such as a photodiode in the case where light 120 originates at the optical fiber end 36E of plug ferrule assembly 70. In the present embodiment, a light emitter configuration for active device 362 is shown by way of example. In an example, active device platform 360 supports one or more active devices 362 and further in an example supports at least one light emitter and one light detector (i.e., photodetector). In an example, the number of active devices 362 equals the number of optical systems 426.

FIGS. 16 and 17 show an optical pathway 450 between active device 362 and optical fiber 36 and when plug 10 and receptacle 300 are mated to form ferrule assembly 390.

Optical pathway 450 includes at least two sections, namely a plug optical pathway 450P on the plug side, and a receptacle optical pathway 450R on the receptacle side. Plug optical pathway 450P is formed by optical fiber 36 and plug gradient index lens 154. The plug and receptacle optical pathways 450P and 450R interface at an optical pathway interface 450I where receptacle gradient index lens first optical surface 155S1 of receptacle ferrule assembly 370 makes contact with plug gradient index lens second optical surface 154S2. This may occur when the first optical surface 155S1 of the receptacle gradient index lens comes in contact with the second optical surface 154S2 of the plug gradient index lens (see, e.g., FIG. 4) or comes in close proximity thereto.

In one example, light 120 from active device 362 at object plane OP initially travels over receptacle optical pathway 450R. Light 120 starts out as divergent and is allowed to expand as it travels toward lens 420. The amount of light expansion is a function of the divergence of light 120 and the distance between active device 362 and the lens. Light 120 then encounters lens 420, which in an example has positive optical power. Positive lens 420 acts to bend the divergent light 120 more toward the optical axis, which forms an expanding (diverging) light beam 120B, i.e., light beam 120B is not collimated. Active device 362 is thus optically coupled to receptacle optical pathway 450R.

Light beam 120B proceeds through a portion of receptacle ferrule body 375 to second optical surface 155S2 of receptacle gradient index lens 155. Receptacle GRIN lens acts to reduce the divergence of the light beam. In one example the light beam is substantially collimated when it reaches optical pathway interface 450I. In some example (See, for example, Table 1A), the receptacle gradient index lens may have a length which is less than ¼ pitch (less than 0.25P), for example between 0.05P and 0.25P. In a further example, the receptacle gradient index lens may have a length which is greater than ¼ pitch (greater than 0.25P), for example 0.5P or longer. Preferably the length of the gradient index lens is less 25P, for example less than 10P, for example less than 3P. As described herein "quarter-pitch" (i.e., ¼ pitch) length of a gradient index lens is the length of gradient index medium in which a substantially collimated bundle of rays is substantially focused to a point by the guiding action of the refractive index gradient. It will be understood that the length of the gradient index lens may also be chosen to be less than ¼ pitch or equal to ¼ pitch. Receptacle optical pathway 450R interfaces with plug optical pathway 450P at optical pathway interface 450I, which is formed by the first optical surface 155S1 of the receptacle gradient index lens 155 and second optical surface 154S2 of the plug gradient index lens 154 second optical surface 154S2. Light thus passes from receptacle 300 to plug 10 through optical pathway interface 450I.

After crossing optical pathway interface 450I the light enters plug optical pathway 450P, which comprises plug GRIN lens 154 and optical fiber 36 Plug GRIN lens 154 acts to focus the light beam to a sufficiently small size to efficiently couple light to optical fiber 36.

Figure 15E:
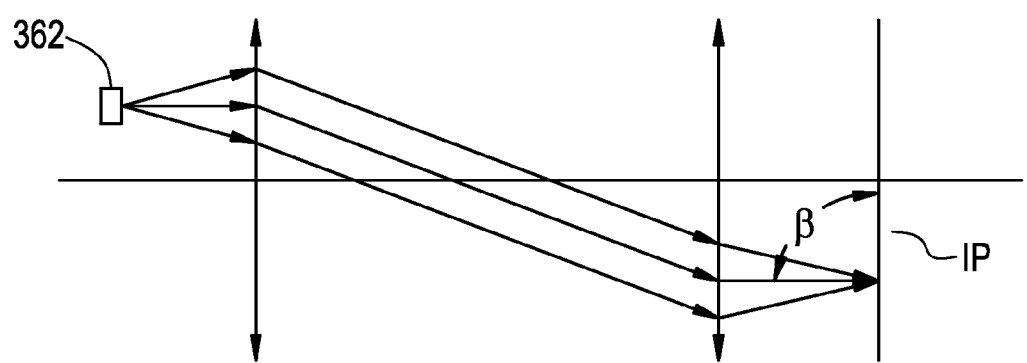
FIG. 15E illustrates schematically a telecentric optical system, corresponding, for example, to FIGS. 15A-15B.

The example designs set forth in Table 1A, 2A, and Table 3A are telecentric, in the sense that light rays departing the object plane OP in a direction parallel to the local axis reach the image plane IP in a direction substantially parallel to the local optical axis independent of any lateral displacement of the source (e.g., the active device). The telecentricity is advantageous, because it enhances the light coupling efficiency when the optical source is laterally misplaced from the optical axis and may result in looser manufacturing tolerances. FIG. 15E is a schematic diagram of a telecentric optical system. The source of the rays in FIG. 15E represents an optical source (for example an active device) that is laterally displaced from the optical axis by a distance dy. The principal ray departing the source in the direction parallel to the local optical axis reaches the image plane IP at a displacement dy' from the local optical axis, and forming an angle $\beta$ with the normal to the local optical axis. The ratio dy'/dy represents the optical magnification of the system. In an ideally perfect telecentric system, the angle $\beta$ is 90°. For example, the optical system is telecentric if the angle $\beta=90°\pm\arcsin(NA/5)$, and preferably $\beta=90°\pm\arcsin(NA/10)$], where NA is the numerical aperture of the optical fiber. Applicants discovered that when the angle $\beta=90°\pm\arcsin(NA/5)$, it is sufficiently close to 90°, so that its difference from 90° does not substantially degrade the coupling efficiency to an optical fiber located at the image plane (whose axis is generally parallel to the local optical axis of the optical system). Preferably, magnification M (M=dy'/dy) is about 0.7 to 0.9. This magnification provides the following advantage: it is sufficiently small that, if the optical source (such as active device 362) is laterally displaced, the consequent lateral displacement of the image of the optical source formed on the fiber is small such that the optical coupling to the fiber is not significantly degraded. At the same time, this magnification is not excessively small (an excessively small magnification would result in rays reaching the optical fiber with a convergence angle exceeding the acceptance angle of the fiber, which would result in degraded coupling)

It is noted that for embodiments involving multiple optical fibers 36, there are multiple optical pathways 450. The example, configurations for plug 10 and receptacle 50 are described by way of illustration (see, for example FIGS. 10A, 10B, 12, 14 and 16) using two optical fibers 36 and thus two optical pathways 450.

As discussed above, optical pathway interface 450I is formed by receptacle gradient index lens 155 of receptacle ferrule 370 contacting or being in close proximity (less than 200 um, preferably less than 100 um, and even more preferably less than 50 um) to plug gradient index lens 154, when plug 10 and receptacle 300 are engaged, for example providing solid-solid contact at the optical pathway interface. This means that there is essentially no air space the surfaces of the two gradient index lenses at optical pathway interface 450I. In an example, receptacle gradient index lens 155 may provide the solid-solid contact by contacting plug gradient index lens 154 with a small amount of space (less than 200 μm) between he surfaces of the two gradient index lenses.

This optical pathway interface 450I, when the distance between the two gradient index lenses 155, 154 is small (less than 200 μm), or when the gradient index lenses 155, 154 form solid-solid interface is advantageous because it prevents viscous liquid, dust, dirt, debris or the like making its way into optical pathway 450. Such contamination can substantially reduce the optical performance of connector assembly 500 formed by mating plug 10 and receptacle 300. If fluid contaminants such as water or oil are present on optical pathway interface 450I, the adverse effects of fluid contaminants on optical performance are generally mitigated. This is because any fluid contaminant that makes its way into optical pathway interface 450I is squeezed between receptacle gradient index lens 155 and plug gradient index lens 154 and essentially becomes a very thin portion of optical pathway 450. Since the contaminant is squeezed to a very thin layer, any optical losses caused by absorption or scattering in the contaminant are reduced. The compressed contaminant does not substantially contribute to Fresnel losses because it is squeezed between two solid faces, i.e., there is essentially no air interface to give rise to the kind of substantial refractive index transition needed for significant Fresnel reflections to occur. It is noted that the optical designs of Tables 1B, 2B and 3B are not telecentric.

Laser Processing of Optical Fibers and Gradient Index Lenses

As discussed above briefly in connection with FIG. 5C, gradient index lenses 154 and 155 and optical fiber ends 36E may be formed by laser processing. Angled surface 105 at plug recess endwall 152 facilitates this laser processing because the laser beam LB can be brought in at an angle other than 90 degrees relative to plug ferrule top surface 71. Thus, angled surface 105 aids in the manufacturing of plug 10 by providing relief that reduces the chance of marking and/or damaging plug ferrule 70 with laser beam LB. Angled surface 105 reduces the chances of laser beam LB interacting with debris during the fiber cutting and/or polishing process. Further, the insertion of the gradient index lenses to a controlled depth facilitates laser cutting of the gradient index lenses to a precise length. In some examples, the length of plug gradient index lens 154 is cut to a single quarter pitch plus any integer multiple of half pitches. The corollary procedure and method for use in laser processing of the receptacle gradient index lens 155 can be performed in a similar manner.

Angled surface 105 can have any suitable angle and/or geometry such as between 30 degrees to 45 degrees relative to vertical (i.e., a straight up and down), but other suitable angles/geometry are also possible. Further, angled surface 105 can have any configuration that preserves dimensions and structural integrity of plug ferrule 70 while also allowing for the formation of optical pathway interface 450I. In other variations, angled surface 105 can also be optionally recessed backward from plug recess endwall 152. By way of example, a shoulder can be formed adjacent angled surface 105, thereby permitting the angled surface to be recessed. For instance, the resultant shoulder can have a depth of about 2 microns or greater from the vertical portion of the sidewall.

In one example the steps of forming a receptacle ferrule assembly comprise inserting a graded index rod of indeterminate length into bore 90 of the receptacle ferrule body which has been pre-loaded with an adhesive of refractive index intermediate between the refractive index of the receptacle ferrule body and the graded index material and proceeding to cause the glue to hold the gradient index rod in place by for example the application of ultraviolet energy to initiate cross-linking as is common with many optical adhesives. In a further step, the precursor assembly thus formed is, by way of example, mounted in a fixture which locates the gradient index rod so that upon impingement of laser beam LB, the gradient index rod thus held it is cut off at a precise length (or fraction of pitch lengths) so as to form in one step a receptacle ferrule assembly.

Thus, in one example, forming a ferrule assembly includes cutting and/or polishing the one or more gradient index lenses with laser beam LB in one or more processing steps. For instance, separate steps may be used for cutting and polishing optical fibers 36 with laser beam LB, but cutting and polishing may also occur in one step. Any suitable type of laser and/or mode of operation for creating laser beam LB can be used. By way of example, the laser (not shown) that generates laser beam LB may be a $CO_2$ laser operating in a pulsed mode, a continuous-wave (CW) mode, or other suitable mode. By way of further example laser beam LB may be moved across gradient index lens 154 or 155 by the motion of a mirror mounted on a galvanometer or alternatively by the motion of the gradient index lenses through an essentially stationary laser beam. The angle between laser beam LB and the optical fiber 36 being processed may also be adjusted to produce the desired angle at the fiber or gradient index lens end 36E, such as 12 degrees, 8 degrees, or flat.

Plug-Receptacle Connector Configurations

Plug 10 and receptacle 300 have complementary configurations that allow for the plug and receptacle to matingly engage while allowing a user to make a quick optical or hybrid electrical and optical contact therebetween. More specifically, in an example, plug ferrule 70 and receptacle ferrule 370 are formed such that plug 10 and receptacle 300 have respective USB connector configurations, as shown for example in FIG. 6 and FIG. 8. Other connector configurations for use in commercial electronic devices are also contemplated herein and can be formed by suitably configuring plug and receptacle ferrules 70 and 370 and their respective ferrule holders 50 and 350.

While plug and receptacle ferrules 70 and 370 have been described above with regard to their ability to support respective plug and receptacle optical pathways 450P and 450R, plug ferrule 70 and receptacle ferrule 370 can also be configured to support electrical connections and corresponding electrical pathways as well, thus providing for a hybrid electrical-optical connection.

Figure 18:
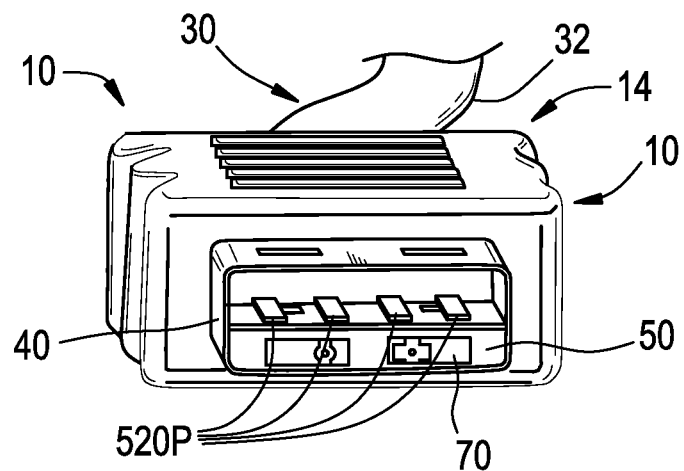
FIG. 18 is an isometric front-end view of an example plug having a plurality of plug electrical contacts.
Figure 19:
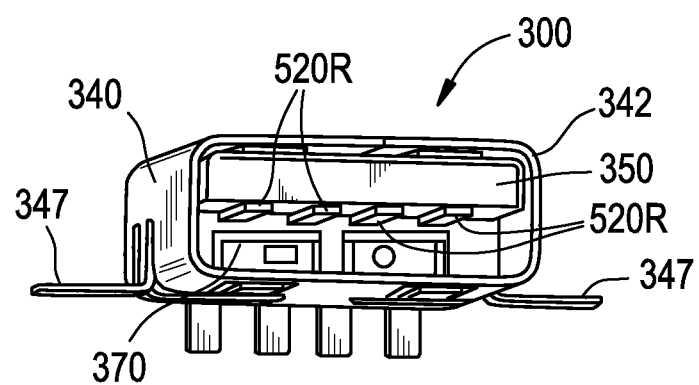
FIG. 19 is a perspective front-end view of an example receptacle having a plurality of receptacle electrical contacts that form an electrical connection with the plug electrical contacts of the plug of FIG. 14, when the plug and receptacle are mated.

FIG. 18 is a front-end isometric view of an example plug 10 that includes plug electrical contacts 520P supported by plug ferrule holder 50. FIG. 19 is a front-end perspective view of an example receptacle 300 that includes corresponding receptacle electrical contacts 520R supported by receptacle ferrule holder 350. Plug and receptacle electrical contacts 520P and 520R form an electrical connection between plug 10 and receptacle 300 when the plug and receptacle are mated. Example electrical contacts may be molded with plug and receptacle ferrules 70 and 370 so that they are relatively flush with a wiping surface of their corresponding ferrules (i.e., the horizontal surface of the ferrule that includes the electrical contacts), or have other suitable attachment means.

Although the disclosure has been illustrated and described herein with reference to preferred embodiments and specific examples thereof, it will be readily apparent to those of ordinary skill in the art that other embodiments and examples can perform similar functions and/or achieve like results. All such equivalent embodiments and examples are within the spirit and scope of the disclosure and are intended to be covered by the appended claims. It will also be apparent to those skilled in the art that various modifications and variations can be made to the present invention without departing from the spirit and scope of the same. Thus, it is intended that the present invention cover the modifications and variations of this invention provided they come within the scope of the appended claims and their equivalents.

What is claimed is:

1. A receptacle ferrule assembly for a fiber optic receptacle connector for mating with a fiber optic plug connector having a plug ferrule assembly with a plug optical pathway, the receptacle ferrule assembly comprising:
   (i) a gradient index lens having a first planar optical surface and a second planar optical surface;
   (ii) a monolithic receptacle ferrule body having first and second ends, with a bore formed at the first end, wherein the bore has an end within the monolithic receptacle body and the gradient index lens resides at least partially and closely within the bore; and (iii) at least one monolithic optical system formed in a monolithic receptacle ferrule body, and comprising
a) a lens formed at the second end of monolithic receptacle ferrule body, and
b) an optical surface defined by the end of the bore, the optical surface being situated adjacent to and mated to the second optical surface of the gradient index lens; wherein the at least one monolithic optical system being structured, in conjunction with said gradient index lens, to define a receptacle optical pathway from the second end of the monolithic optical system to the first surface of the gradient index lens.

2. The receptacle ferrule assembly of claim 1 in which the length of the receptacle optical pathway is between 0.3 mm and 12 mm.

3. The receptacle ferrule assembly of claim 1, wherein the ferrule body is formed from material that transmits light having a wavelength in the range from 850 nm to 1550 nm.

4. The receptacle ferrule assembly of claim 1, further comprising a plurality of optical fibers and a corresponding plurality of monolithic optical systems.

5. The receptacle ferrule assembly of claim 1 wherein said gradient index lens has a length L longer than 0.25P, wherein P is the pitch of the gradient index lens.

6. The receptacle ferrule assembly according to claim 1 wherein:
the monolithic receptacle ferrule body has opposite back and front ends.

7. The receptacle ferrule assembly for a fiber optic receptacle connector according to claim 1, wherein:
the monolithic receptacle ferrule body has top and bottom surfaces and the lens is formed at the bottom surface, and the monolithic optical system further includes a mirror formed at the back end.

8. The receptacle ferrule assembly of claim 7, wherein said gradient index lens has a center refractive index Nc and an edge refractive index Ne, and 1.015Ne≤Nc≤1.035Ne.

9. The receptacle ferrule assembly of claim 7, wherein the lens formed at the bottom surface includes a refractive surface with radius of curvature and a vertex, and an active device is situated at a distance of 0.145 mm to 0.185 mm from the vertex of the lens formed at the bottom surface, and the radius of curvature for said lens is 0.43 mm to 0.65 mm, and said lens has a has a conic constant C of −12 to −18.

10. The receptacle ferrule assembly of claim 9, wherein (i) said gradient index lens has a center refractive index Nc and an edge refractive index Ne, and 1.015Ne<Nc<1.035Ne; and/or (ii) the diameter of the gradient index lens is between 250 μm and 600 μm.

11. An assembly, comprising:
the receptacle ferrule assembly of claim 1; and
an active device arranged adjacent the lens formed at the second end of the monolithic receptacle ferrule body.

12. A connector assembly comprising:
the receptacle ferrule assembly of claim 1, wherein the gradient index lens constitutes a receptacle gradient index lens; and
a plug ferrule with a plug gradient index lens, said plug assembly matingly engaged to the receptacle ferrule assembly so that the plug and receptacle gradient index lenses define an interface between the plug and receptacle optical pathways.

13. A connector assembly comprising:
the receptacle ferrule assembly of claim 1; and
a plug ferrule, said plug assembly matingly engaged to the receptacle ferrule assembly.

14. The receptacle ferrule assembly of claim 1, wherein the monolithic receptacle ferrule body is formed from material that transmits light having a wavelength in the range from 850 nm to 1550 nm.

15. A receptacle ferrule assembly for a fiber optic receptacle connector for mating with a fiber optic plug connector having a plug ferrule assembly with a plug optical pathway, the receptacle ferrule assembly comprising:
a gradient index lens having a first planar optical surface and a second planar optical surface;
a monolithic receptacle ferrule body having first and second ends, wherein the first end includes a bore with a planar end, and wherein the gradient index lens resides closely within the bore so that the monolithic ferrule body at least partially surrounds an outside portion of the gradient index lens;
at least one monolithic optical system formed in a monolithic receptacle ferrule body and including
a) a lens formed at the second end of monolithic receptacle ferrule body, and
b) the planar end of the bore defining a planar optical surface that is in contact with the second optical surface of the gradient index lens; and
wherein the at least one monolithic optical system being configured, in conjunction with said gradient index lens, to define a receptacle optical pathway from the second end of the monolithic optical system to the first surface of the gradient index lens wherein the gradient index lens has a first mating geometry and is configured to form with the fiber optic plug connector a substantially solid-solid contact at an interface with the fiber optic plug connector, wherein said substantially solid-solid contact is sufficient to substantially expel liquid from the interface such that the plug optical pathway is optically coupled through said interface with the receptacle optical pathway.

16. A receptacle ferrule assembly for a fiber optic receptacle connector for mating with a fiber optic plug connector having a plug ferrule assembly with a plug optical pathway, the receptacle ferrule assembly comprising:
a gradient index lens having a first optical surface and a second optical surface;
a monolithic receptacle ferrule body having first and second ends, with a bore formed in the first end, with the bore having a planar end within the monolithic receptacle ferrule body, and the gradient index lens disposed closely within the bore such that the monolithic ferrule body surrounds at least an outside portion of the gradient index lens;
at least one monolithic optical system formed in a monolithic receptacle ferrule body and including
a) a lens formed at the second end of monolithic receptacle ferrule body, and
b) the planar bore end defining an optical surface situated adjacent to and mated to the second optical surface of the gradient index lens; and
wherein the at least one monolithic optical system is configured, in conjunction with said gradient index lens, to define a receptacle optical pathway from the second end of the monolithic optical system to the first surface of the gradient index lens wherein the first optical surface of the lens is situated a distance of not more than 200 μm from a directly opposing optical surface of said fiber optic plug connector, such that the plug optical pathway is optically coupled through said interface with the receptacle optical pathway, and said distance is being sufficient to substantially small to expel liquid from the interface.

17. A connector assembly comprising:
a receptacle ferrule assembly comprising
a receptacle gradient index lens having a first optical surface and a second optical surface;
a monolithic receptacle ferrule body having first and second ends, with the first end having a bore formed therein, the bore having a planar end, and wherein the receptacle gradient lens resides at least partially and closely within the bore;
at least one monolithic optical system formed in a monolithic receptacle ferrule body and including
  a) a lens formed at the second end of monolithic receptacle ferrule body, and
  b) the bore end defining an optical surface formed in the monolithic receptacle ferrule body, the optical surface being situated adjacent to and mated to the second optical surface of the receptacle gradient index lens; and
wherein the at least one monolithic optical system being configured, in conjunction with said receptacle gradient index lens, to define a receptacle optical pathway from the second end of the monolithic optical system to the first surface of the receptacle gradient index lens; and
B) a plug ferrule, said plug assembly matingly engaged to the receptacle ferrule assembly, further comprising the plug ferrule assembly having a front end configured to engagingly mate with the receptacle ferrule assembly, the plug ferrule assembly having a plug ferrule body supporting at least one plug gradient index lens, the plug gradient index lens
  i. being optically coupled to an end of an optical fiber, and
  ii. in conjunction with end of the optical fiber defining a plug optical pathway, and
  iii. being supported by the plug ferrule body;
the plug gradient index lens supported by the plug ferrule body being adjacent to and optically coupled to the receptacle gradient index lens of the receptacle ferrule assembly to form an optical pathway interface between the receptacle optical pathway and the plug optical pathway.

18. The connector assembly of claim 17 wherein said assembly satisfies at least one of the following: (i) the receptacle optical pathway and the plug optical pathway form a telecentric optical system; (ii) wherein the plug gradient index lens supported by the plug ferrule body has a diameter between 250 μm and 600 μm; (iii) the numerical aperture of the optical fiber is not larger than the numerical aperture of the plug gradient index lens supported by the plug ferrule body.

19. A connector assembly for a fiber optic connector, comprising:
(a) a receptacle ferrule assembly comprising
  (a) a monolithic receptacle ferrule body having a bottom surface and a front end, the receptacle ferrule assembly having formed therein at least one optical system having a lens formed at the bottom surface of the receptacle ferrule body and a mirror formed at the back end of the receptacle ferrule body, and a planar optical surface formed within a bore at the front end;
  (b) a receptacle gradient index lens closely disposed within the bore, the receptacle gradient index lens having a front surface and a rear surface, wherein the rear surface is in contact with the planar optical surface within the bore; and
  wherein the at least one optical system and receptacle gradient index lens to define a receptacle optical pathway from the bottom surface to the front surface of said receptacle gradient index lens, and the optical pathway has a substantially right-angle bend; and
a plug ferrule having a plug ferrule body with a front end and that supports at least one plug gradient index lens, with the at least one plug gradient index lens in conjunction with the plug ferrule body defining a plug ferrule optical pathway; and
wherein the receptacle and plug ferrules assemblies matingly engage at their respective front ends to form a solid-solid optical pathway interface between the receptacle optical pathway and the plug optical pathway, where light crossing the solid-solid optical pathway is either collimated, convergent or divergent.

* * * * *

UNITED STATES PATENT AND TRADEMARK OFFICE
CERTIFICATE OF CORRECTION

PATENT NO. : 9,638,873 B2  
APPLICATION NO. : 13/353768  
DATED : May 2, 2017  
INVENTOR(S) : Venkata Adiseshaiah Bhagavatula et al.

Page 1 of 1

It is certified that error appears in the above-identified patent and that said Letters Patent is hereby corrected as shown below:

On the Title Page

In Column 2, item (57), Abstract, Line 10, delete "lens The" and insert -- lens. The --, therefor.

In the Claims

In Column 21, Line 49, Claim 9, delete "has a has a" and insert -- has a --, therefor.

In Column 22, Line 66, Claim 16, delete "situated a" and insert -- situated at a --, therefor.

In Column 23, Line 30, Claim 17, delete "B)".

Signed and Sealed this  
Eighth Day of August, 2023

Katherine Kelly Vidal  
*Director of the United States Patent and Trademark Office*